United States Patent [19]
Douglass et al.

[11] Patent Number: 6,115,441
[45] Date of Patent: *Sep. 5, 2000

[54] TEMPERATURE DETECTOR SYSTEMS AND METHODS

[75] Inventors: James Michael Douglass, Dallas; Gary V. Zanders, Plano; Donald R. Dias, Carrollton; Robert D. Lee, Denton, all of Tex.

[73] Assignee: Dallas Semiconductor Corporation, Dallas, Tex.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/998,298

[22] Filed: Dec. 24, 1997

Related U.S. Application Data

[63] Continuation of application No. 08/797,153, Feb. 10, 1997, abandoned, which is a continuation of application No. 08/253,445, Jun. 7, 1994, Pat. No. 5,638,418, which is a continuation-in-part of application No. 08/013,883, Feb. 5, 1993, Pat. No. 5,388,134, which is a continuation-in-part of application No. 07/725,793, Jul. 9, 1991, abandoned.

[51] Int. Cl.$^7$ .................................................... G01K 1/02
[52] U.S. Cl. ........................ 377/25; 374/163; 374/170; 374/171; 364/528.34; 702/99; 702/130
[58] Field of Search ............................... 374/1, 163, 170, 374/171; 377/25; 364/528.34; 702/99, 130

[56] References Cited

U.S. PATENT DOCUMENTS

| | | | |
|---|---|---|---|
| 3,942,123 | 3/1976 | Georgi | 377/25 |
| 4,527,896 | 7/1985 | Irani et al. | 356/43 |
| 5,388,134 | 2/1995 | Douglass et al. | 377/25 |
| 5,638,418 | 6/1997 | Douglass et al. | 377/25 |

*Primary Examiner*—Margaret R. Wambach
*Attorney, Agent, or Firm*—Jenkens & Gilchrist, a Professional Corporation

[57] ABSTRACT

A temperature detector comprising temperature sensing circuitry, calibration circuitry, and power regular circuitry. The temperature sensing circuitry has an output that varies with temperature to create a temperature variation. The calibration circuitry is coupled to receive the output that varies with temperature to create a temperature variation. The calibration circuitry interprets the temperature variation and outputs a valve that represents the temperature. The power supply regulator circuitry coordinates power to the temperature sensing circuitry.

12 Claims, 22 Drawing Sheets

$t_1$ = TIME TO CHARGE TO $V_{TRIP} + V_{OFFS}$
$t_2$ = DELAY FROM $t_1$ TO
$\tau_{OSC} = 2(t_1 + t_2)$ BASE: COUNT VALUE AT Tmin.
SLOPE: NUMBER OF COUNTS PER ΔT AT Tmin.
SLOPE_ADJUST: NUMBER OF COUNTS SLOPE IS INCREASED AT EACH ΔT.
ΔT: SMALLEST TEMPERATURE INCREMENT.

TEMPERATURE DETECTOR SYSTEMS AND METHODS

CROSS-REFERENCE TO RELATED APPLICATIONS

This application hereby is a continuation-in-part of the following co-assigned patent application, which it herein also incorporates by reference:

| Serial No./<br>Patent No. | Filing Date/<br>Issue Date | DSC Case No. | Authors |
|---|---|---|---|
| 08/013,883 | 02/05/93 | DSC-389 | Douglass et al. |
| 07/725,793 | 07/09/91 | DSC-175 | Curry et al. |

In addition, Applicants also incorporate by reference the data sheet for the DS1620, which is included in the Appendix A and a listing of software used to enhance resolution, which is included in Appendix B.

PARTIAL WAIVER OF COPYRIGHT PURSUANT TO 1077 O.G. 22 (Mar. 20, 1987)

(C) Copyright, Dallas Semiconductor Corporation 1994. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the mask work registration laws of the United States and of other countries.

However, permission to copy this material is hereby granted to the extent that the owner of the copyright and mask work rights has no objection to the facsimile reproduction by anyone of the patent document or patent disclosure, as it appears in the United States Patent and Trademark Office patent file or records, but otherwise reserves all copyright and mask work rights whatsoever.

FIELD OF THE INVENTION

The present invention relates to electronic devices, and, more particularly, to integrated circuit temperature detection systems and methods.

BACKGROUND

Accurate and timely temperature information is needed in a host of applications in modern industrial society. For instance, temperature monitoring is required in controlling processes, maintaining controlled environments (e.g., temp-cycle test equipment, air conditioning), monitoring equipment, and monitoring exposure. Moreover, automatic (electronic) systems (e.g., process control systems) typically require all electronic temperature measurement systems and the data provided by in a digital format, so that microcontrollers and microprocessors often used in those applications can readily accept and process the temperature information.

Existing temperature measurement devices often combine circuitry with discrete temperature sensitive items (e.g., thermistors), which are inherently analog devices and provide an analog output. An analog-to-digital converter is then needed to convert the analog output to a digital format. Alternative existing temperature measurement devices do not provide an accurate, reliable reading (if any) over a large temperature range. All of these characteristics associated with existing temperature measurement devices may adversely affect the overall efficiency and accuracy of the system as well as the degree and ease with which the resulting system can be combined into a small, miniaturized circuit (e.g., integrated).

Problems encountered with addressing these shortcomings are numerous. In particular, modern temperature measurement devices do not address or accommodate for the sensitivities of many electrical/electronic components and subcomponents (e.g., oscillators, power supplies, etc.) to temperature and/or changes in temperature. In addition, modern temperature measurement devices do not provide high degrees of resolution and/or adjustable degrees of resolution. Similarly, modern temperature measurement devices that produce a digital output do not provide temperatures having increased accuracy, resolution, etc. over a wide range of temperatures.

SUMMARY OF THE INVENTIONS

Preferred system embodiments of the disclosed temperature detector generally comprise temperature sensing circuitry, calibration circuitry, and power supply regulator circuitry. The temperature sensing circuitry has an output that varies with temperature. The calibration circuitry receives the output that varies with temperature, interprets the temperature variation, and outputs a value that represents the temperature. The power supply regulator coordinates power input to the temperature sensing circuitry and to the calibration circuitry. The temperature sensing circuitry, calibration circuitry, and power supply regulator are preferably combined into an integrated circuit. Note that while numerous modifications exist, the resolution can be increased by reading the actual values contained in the registers and/or not rounding the values contained therein. In addition, note that the modifications to enhance resolution are independent of the power regulation circuitry, so that the power regulation circuitry is not necessarily needed for some applications.

More specifically, while numerous temperature sensing circuitry can be used, the temperature sensing circuitry in preferred embodiments comprises delay circuitry to produce a signal delayed by a length of time correlating with the temperature and timing circuitry coupled to receive the signal and to convert the signal into the output correlating to the temperature output. The temperature output is in a digital format. In addition, the temperature sensing circuitry further comprises control circuitry coupled to the timing circuitry and to the delay circuitry to activate the delay circuitry and the timing circuitry and synchronize all communication between the timing circuitry and the delay circuitry. Preferably, the timing circuitry continuously runs and has a reset to turn on and off the timing circuitry. The timing circuitry is intermittently active to limit power consumption. The timing circuitry and the delay circuitry may be powered by a battery. The temperature output varies approximately linearly upon temperature. The digital output varies approximately linearly upon temperature.

Moreover, the delay circuitry comprises a first oscillator to generate oscillations at a first oscillation rate. The first oscillation rate preferably has a first sensitivity to temperature (e.g., sensitive to changes in temperature) and a first counter coupled to the first oscillator and to count the oscillations generated by the first oscillator. The timing circuitry comprises a second oscillator to generate oscillations at a second oscillation rate. The second oscillation rate preferably has a second sensitivity to temperature (e.g., insensitive to changes in temperature). A second counter coupled to the first counter of the delay line circuitry to count the oscillations generated by the second oscillator. The second counter preferably wraps around, so that said second counter counts continuously.

Regarding the sensitivities to temperature, the first oscillator may comprise RC oscillator circuitry having at least one set of a first resistor and a first capacitor coupled together and the second oscillator comprises RC oscillator circuitry having at least one set of a second resistor and a second capacitor coupled together, where the first resistor(s) has a first sensitivity to temperature and the second resistor (s) has a second sensitivity to temperature. As stated above, the first sensitivity is different from the second sensitivity. Both the first resistor(s) and the second resistor(s) are selected from the group consisting of standard polysilicon resistors and n-well diffused resistors. The first oscillator and said second oscillator oscillate at approximately 200 KHz. The temperature ranges between a first temperature (e.g., −55 degrees Celsius) and a second temperature (e.g., +125 degrees Celsius). As stated above, the first sensitivity in alternate preferred embodiments is greater than the second sensitivity, so that the first oscillation rate is more sensitive to temperature than the second oscillation rate. The second sensitivity is very low and the first sensitivity is comparatively quite high, so that the first oscillation rate is not very sensitive to temperature and the second sensitivity is not very sensitive to temperature.

The calibration circuitry interprets the temperature variation by fitting a preselected mathematical model to the time interval, which in some preferred embodiments is a quadratic fit. The "fitting" comprises an iterative, linear fit and then a quadratic fit. In other words, temperature sensing circuitry provides an integrated circuit temperature detector which runs an oscillator with a large temperature dependency up to a fixed count to thereby generate a time interval indicating temperature. The time interval may be used to gate an oscillator with a small temperature dependence to generate an output count (number of oscillations) varying approximately linearly with temperature. This provides for simple calibration due to the linearity and yields a direct digital expression of temperature. Alternative temperature detectors could use other temperature sensitive time interval generators such as an integrator of a temperature sensitive current. Digital temperature measurement permits use of the measurement as a direct input to a microcontroller or, more simply, as an address for a Read Only Memory ("ROM") to read out desired process control parameters.

The power regulator preferably regulates the power supply over a wide range of global power supply voltages in order to insure a fixed power supply. In addition, the power regulator enables the power supply to provide a fairly large amount of current (e.g., >1 mA). The charge pump permits the power supply to remain regulated, even when power supplied to it is extremely low. However, when $V_{DD}$ goes to about 3 volts, regulation is killed, so the lower limit of $V_{DD}$ is limited to around 3.5 volts. Preferred circuit embodiments of the power regulator comprise a charge pump input having an output coupled to the drain and gate of a first transistor. The source of the first transistor is coupled to the output of a reference voltage generator to provide $V_{REF}$. The gate of the first transistor is preferably coupled to the gates of a second transistor and a third transistor. The sources of the second transistor and the third transistor are coupled to power the first and second oscillators respectively.

The advantages are as follows. Preferred system and process embodiments measure temperature using monolithic silicon implementations without an external sensor. In contrast to other temperature measuring circuits, which typically attempt to measure a change in $V_{be}$ for a bipolar transistor, this sensor compares periods of two oscillators having different temperature coefficients (hereafter "tempcos"). Preferred system embodiments are approximately accurate within ±0.5° Celsius (hereafter "C") in the range from −55° C. to 125° C. Disclosed circuitry operates with supply voltages of 3.5V to 5.5V and consumes no more than 55 $\mu$A when operating and leakage only when in a standby condition.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Figure 1A:
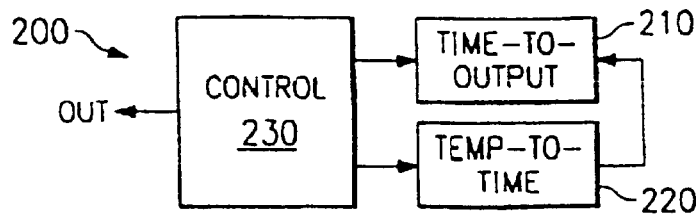
FIG. 1A is a functional/structural block circuit diagram of a preferred embodiment of temperature detector 200.

FIG. 1A is a functional/structural block circuit diagram of one preferred embodiment of the temperature detector or temperature sensing circuitry, generally denoted by reference numeral 200, which comprises time-to-output converter 210 (e.g., or timing circuit 210), temperature-to-time converter 220 (e.g., or delay circuitry 220), and control block 230, which controls the operation of temperature-to-time convertor 220 and time-to-output converter 210 and also houses circuitry to calibrate the outputs of these modules that reflect temperature. Time-to-output converter 210 has a much smaller temperature dependence than temperature-to-time converter 220. Basically, temperature-to-time converter 220 provides a time interval dependent upon temperature, and this time interval controls (such as the interval from turning on until turning off) time-to-output converter 210. That is, temperature detector 200 provides a temperature-to-time converter 220. Timing circuit 210 produces an output indicative of the duration of its activity which thus correlates with temperature and may have any desired format.

For example, timing circuit 210 could provide a digital output and thus would essentially be a time-to-count converter. Various implementations of blocks 210 and 220 appear in the following embodiments and include both the use of a continuously running timing circuit 210 with a reset as the "turning on and turning off" and the use of an only-intermittently active timing circuit 210 to limit power consumption for battery powered operation. Similarly, temperature-to-time converter 220 may be only intermittently active in order to both conserve power and avoid self-heating problems. Control block 230 provides activation and synchronization.

When temperature-to-time converter 220 has an output depending linearly upon temperature, then the output of timing circuit 210 will also depend linearly on temperature and simplify the circuitry and its calibration.

In one sense, temperature-to-time converter 220 amounts to a delay line with a temperature dependent delay, and timing circuit 210 amounts to a converter of time intervals to signals of another format. Timing circuit 210 could have large temperature dependence provided that it does not match that of temperature-to-time converter 220, and temperature detector 200 would then essentially operate on the difference in temperature coefficients.

Figure 1B:
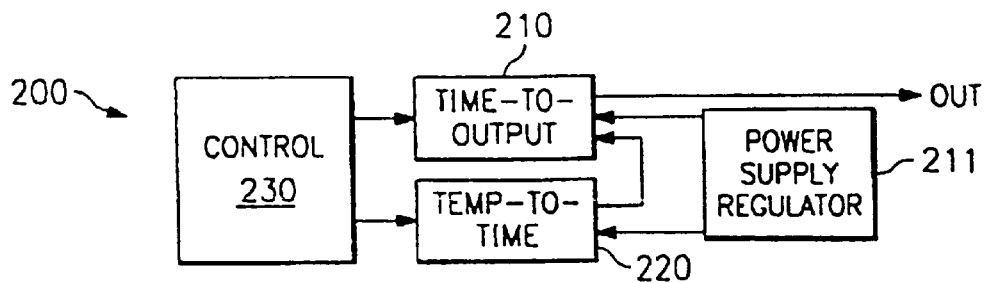
FIG. 1B is a functional/structural block circuit diagram showing the improved power supply regulator combined with the functional/structural block circuit diagram of the preferred embodiment temperature detector 200 shown in FIG. 1A.

FIG. 1B is a functional/structural block circuit diagram showing the improved power supply regulator 211 combined with the functional/structural block circuit diagram of the preferred embodiment of temperature detector 200 shown in FIG. 1A. The use of power supply regulator 211 is preferred, because time-to-output converter 210 and temperature-to-time converter 220 were found to have a significant dependence upon $V_{DD}$—thereby providing two different readings at a constant temperature. As a result, power supply regulator 211 was added to regulate the power supplied to time-to-output converter 210 and temperature-to-time converter 220. Preferred embodiments use power supply regulator 211, because it is unconditionally stable, tolerant to widely varying $V_{DD}$ and loads, and capable of supplying a regulated voltage within 0.6 V of the power supply. In addition, preferred embodiments prefer a source follower output, but this normally would require a gate voltage higher than $V_{DD}$. Preferred embodiments of power supply regulator 211 is discussed below.

Figure 1C:
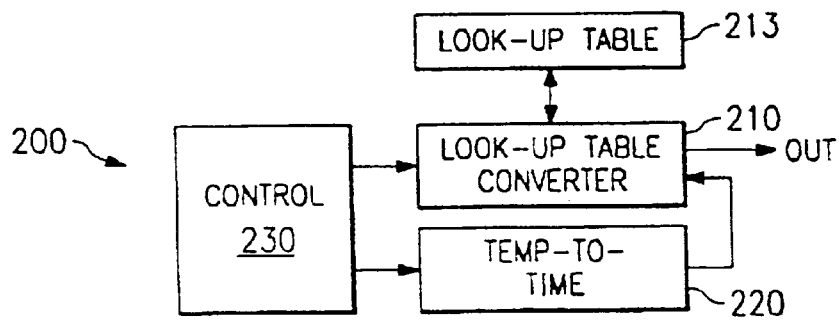
FIG. 1C is a functional/structural block circuit diagram of an alternate preferred embodiment temperature detector 200 shown in FIG. 1A comprising a look-up table to do the time-to-output conversion.

FIG. 1C is a functional/structural block circuit diagram of an alternate preferred embodiment temperature detector 200 shown in FIG. 1A comprising a look-up table 213 to do the time-to-output conversion, which can take into account any calibration of the temperature detector 200, preferably comprising time-to-output converter 210 and temperature-to-time converter 220. In particular, a look-up table 213, which is stored in a memory (e.g., EPROM, ROM, etc.), can be used by the time-to-output convertor 210 to streamline the conversion process. If the other components are integrated together into one integrated circuit, look-up table 213 may or may not be combined in the overall integrated circuit. In short, the look-up table 213 can be located on- or off-chip.

Figure 2A:
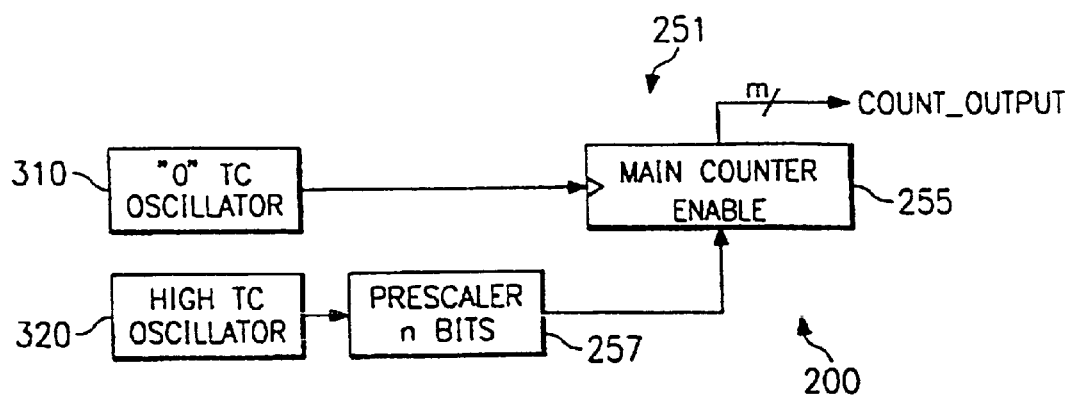
FIG. 2A is a more detailed block diagram of the temperature detector 200, shown in FIG. 1A.

FIG. 2A is a more detailed block diagram of the temperature detector 200 shown in FIGS. 1A and 1B. The block diagram incorporates two oscillators 310 ("the 0 or zero TC Oscillator" 310) and 320 ("the High or hi TC Oscillator"). The time period associated with the oscillations produced or created by oscillator 320 has a highly positive temperature coefficient, which has a high temperature dependence. The time period associated with the oscillations produced or created by oscillator 310 preferably has a zero or very low temperature coefficient, which has a low temperature dependence. The important condition, however, is that the temperature coefficients are unequal. Oscillators 310 and 320 could be based on Resistor-Capacitor ("RC") timing schemes that use resistors comprised of materials having temperature characteristics suitable for each application. For example, materials for resistors in oscillator 320 are preferably comprised of n-well materials and materials for resistors in oscillator 310 are preferably comprised of polysilicon materials that have a zero temperature coefficient. High TC oscillator 320 clocks a n-bit prescale counter 257 that sends an enable signal to the shown main counter 259 for $2^n$ clocks. During the time the main counter 259 is enabled, it is clocked by a "0" TC oscillator 310 that does not vary with temperature. A temperature sample is taken by initializing the main counter 259 to zero. Both oscillators 310 and 320 are started, with the enable signal becoming immediately active and remaining so until n-bit prescaler counter 257 rolls over. It can be seen that the time the enable window is valid varies strongly with temperature; for higher temperatures the window becomes wider. Therefore, since the clock to main counter 259 does not vary with temperature, the value in main counter 259 when the window closes is directly proportional to the enable window width according to EQUATION 1:

$$\text{count\_output} = \frac{\tau hiTC * 2^n}{\tau loTC} \qquad \text{EQUATION 1}$$

Where:

$\tau hiTC$ is the period of the high TC counter.

$\tau loTC$ is the period of the "0" TC counter $n$ is the number of bits in the prescale counter.

Main counter 259 then contains a value that is proportional to temperature. Assuming a linear variation of the period for hi TC oscillator 320 with temperature, by finding the counts at two different temperatures it is possible to develop a translation from the count values to temperature. The size of main counter 259, m, is a function of the desired accuracy and will be found later.

Figure 2B:
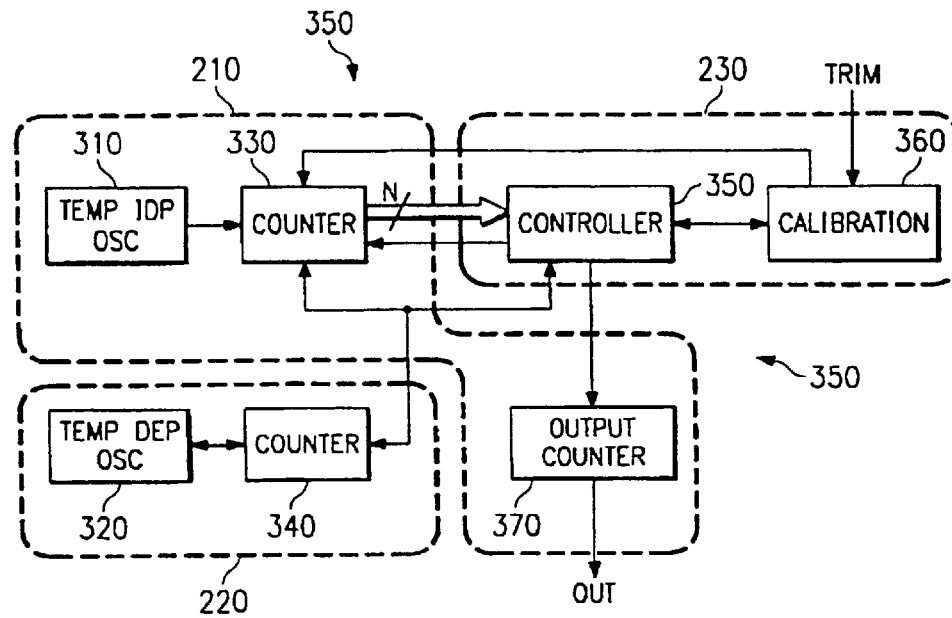
FIG. 2B is an alternate, even more-detailed preferred block diagram than that shown in FIG. 2A of the temperature detector 200.
Figure 2C:
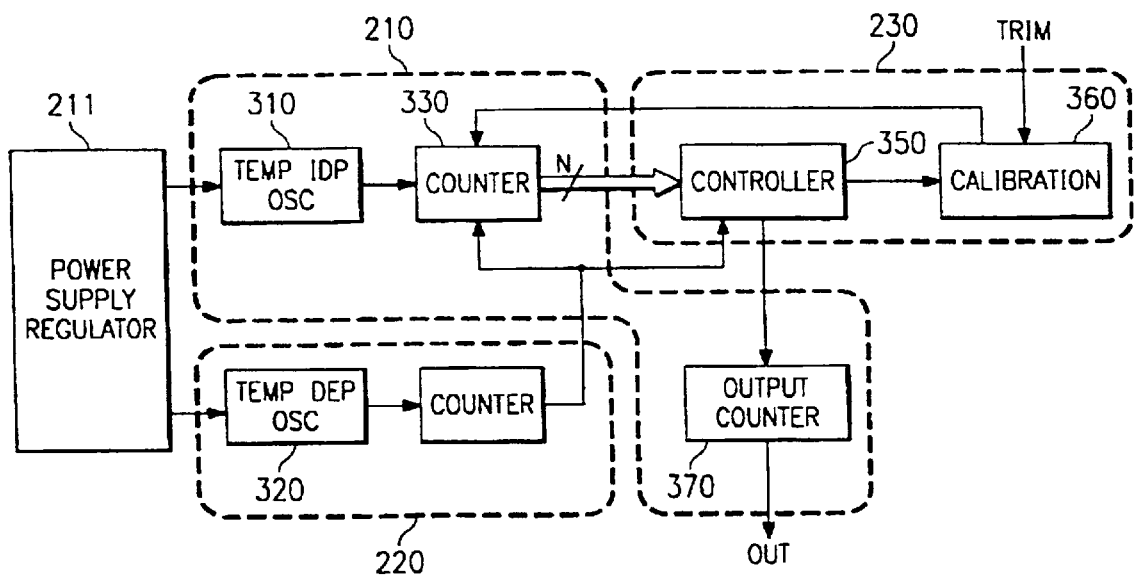
FIG. 2C is a more detailed preferred block diagram of the temperature detector 200, shown in FIG. 1B showing the improved power supply regulator 211 combined with the functional/structural block circuit diagram of the preferred embodiment temperature detector 200 shown in FIG. 1A.
Figure 3A:
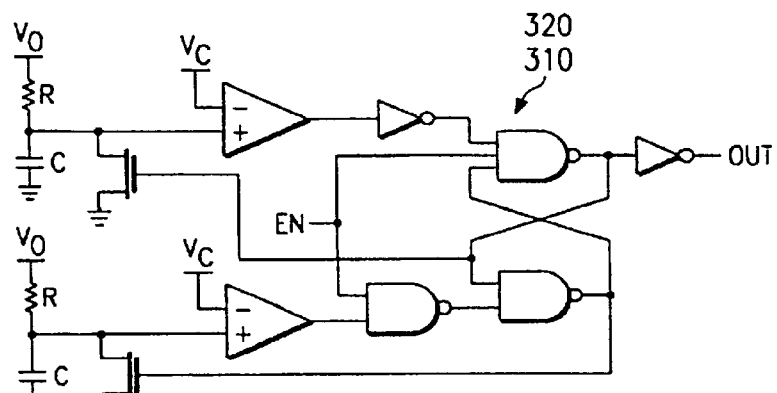
FIG. 3A is an illustration of an oscillator used in the temperature detector 200 of FIGS. 2A and 2B.
Figure 4:
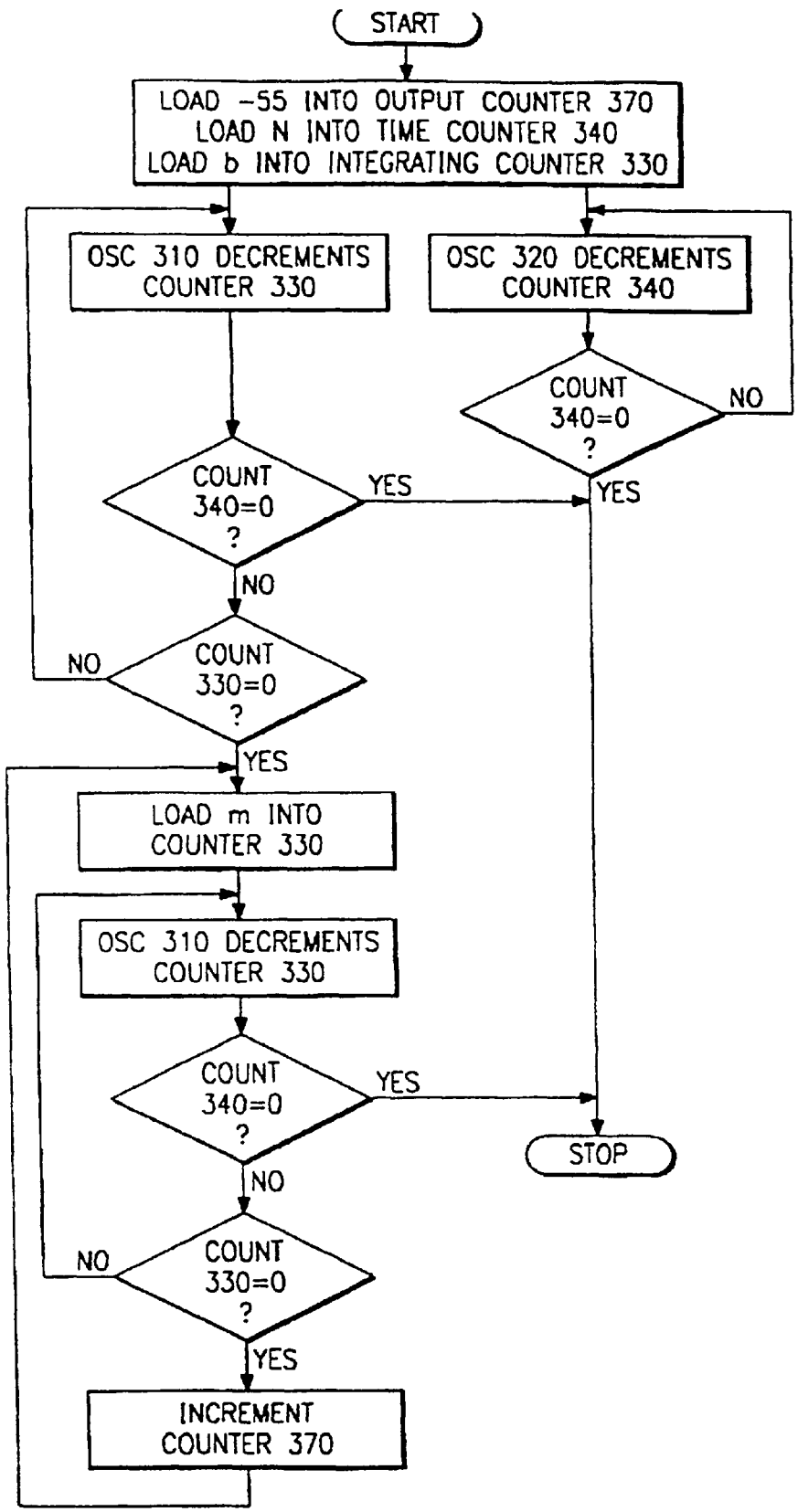
FIG. 4 is a flow chart illustrating operation of the temperature detector 200 of FIG. 5.

An alternate, even more-detailed preferred block diagram than that shown in FIG. 2A of the temperature detector 200 is shown in FIG. 2B. FIG. 2B illustrates the first preferred embodiment temperature detector 200, generally denoted by reference numeral 200, and including temperature insensitive oscillator 310, temperature sensitive oscillator 320, counter 330, counter 340, controller 350, calibration logic 360, which comprises intercept and slope registers for calibration, and output counter 370. Counter 340 is preferably a down counter that counts to 0 and gets reloaded, so that the a circular counter wraps around and counts continuously. Similarly, FIG. 2C is an more detailed preferred block diagram of the temperature detector 200, shown in FIG. 1B showing the improved power supply regulator 211 combined with the functional/structural block circuit diagram of the preferred embodiment temperature detector 200 shown in FIG. 1A. Counter 330 counts the oscillations of temperature insensitive oscillator 310, and circular counter 340 counts the oscillations of temperature sensitive oscillator 320. Oscillators 310 and 320 each have the structure shown in FIG. 3A, but with different types of resistors which leads to their differing temperature dependencies. The period, t, of oscillation of the RC oscillator of FIG. 4 is shown in the following EQUATION 2, wherein t equals:

$$t = 2RCln[V_0(V_0 - V_c)] + 2K \qquad \text{EQUATION 2}$$

where K is the propagation delay through one of the comparators and NAND-gate flip-flop structures plus overdrive time due to finite gain and slew rate in the comparators. Of course, R, C, $V_0$, $V_c$, and K all depend upon temperature. However, if $V_c$ is taken to be a fraction of $V_0$, such as by use of a voltage divider, then the natural logarithm will be independent of both $V_0$ and $V_c$. The linear approximation for the resistance R of the resistor is shown in the following EQUATION 3, where R equals:

$$R(T) = R(T_0)[1 + \alpha T] \qquad \text{EQUATION 3}$$

where $R(T_0)$ is the resistance at a reference temperature $T_0$, $\alpha$ is the temperature coefficient of resistance (TCR), and T equals $T - T_0$. Now a roughly equals +5300 parts per million per degree Celsius (ppm/° C.) for n-well diffused resistors in silicon integrated circuits, but has a value of roughly 850 ppm/° C. for standard polysilicon resistors. The capacitance similarly has a temperature coefficient on the order of ±100 ppm/°C., and the propagation delay for CMOS devices has a temperature coefficient of roughly 1500 ppm/° C.

Temperature insensitive oscillator 310 employs polysilicon resistors and temperature sensitive oscillator 320 uses diff-used resistors; this difference provides the temperature sensitivity characterizations of the oscillators. Indeed, temperature sensitive oscillator 320 slows down more than temperature insensitive oscillator 310 as temperature increases due to its greater TCR resistors. Also, oscillators 310 and 320 each oscillate at about 200 KHz, so the period is on the order of 5 microseconds ($\mu s$) and this makes the propagation delay K, which is roughly 100 nanoseconds (ns), small compared to the RC term in the oscillation period expression.

Temperature insensitive oscillator 310 and temperature sensitive oscillator 320 run continuously, and temperature detector 200 (in FIG. 2A) or 300 (in FIG. 2B) measures temperature roughly as follows. For simplicity, first presume counter 330 contains an initial count of 0 and counter 340 is initially loaded with a count of N, which is on the order of 1000. Counter 340 will count down to 0 and this will generate a disable signal for counter 330 to stop counting until cleared and reenabled. Now the time required for counter 340 to count N oscillations from temperature sensitive oscillator 320 is shown in the following EQUATION 5:

$$N\{2R_{HI}(T)C_{HI}(T)1n[V_0/(V_0-V_c)]+2K_{HI}(T)\}=Nt_{HI}(T) \quad \text{EQUATION 5}$$

where the subscript HI indicates temperature sensitive oscillator 320 with a high temperature dependence, and the temperature dependence is explicit. During this time interval of length $Nt_{HI}(T)$ counter 330 has counted a total of M(T) counts where $M(T)=Nt_{HI}(T)/t_{LO}(T)$ with $t_{LO}(T)$ the period of temperature insensitive oscillator 310 which has a low temperature dependence. The propagation delays are small compared to the oscillator periods, so their temperature variation can be ignored. And the temperature dependence of the capacitance is the same for both oscillators and effectively cancels out. Thus choosing resistor $R_{LO}$ of temperature insensitive oscillator 310 with a small TCR implies that only the temperature variation of $R_{HI}$ of temperature sensitive oscillator 320 need be considered and M(T) has the form shown in the following EQUATION 6A:

$$M(T)=N\{R_{HI}[1+\alpha T]C_{HI}1n[V_0/(V_0-V_c)]+K_{HI}\}/\{R_{LO}C_{LO}1n[V_0/(V_0-V_c)]+K_{LO}\} \quad \text{EQUATION 6B}$$

where all of the parameters are temperature independent. This shows that M(T) depends linearly on T under these approximations.

The number of counts in counter 330 when counter 340 counts down to 0 depends upon temperature and increases with increasing temperature. For example, with diffused and polysilicon resistors in oscillators 320 and 310, respectively, both oscillators running at roughly 200 KHz, and N about 1000, M(T) varies by about 5 counts per degree Celsius and $M(T_0)$ equals about 1000. And counter 340 takes about 5 milliseconds to count down from 1000 to 0, so a measurement cycle takes a little more than 5 milliseconds. Note this is only a hypothetical example.

Temperature detector (in FIG. 2B) does not directly use a total number of counts in counter 330, but rather makes repetitive count downs with counter 330 to increment the output temperature in output counter 370 and thereby directly reads out degrees Celsius over a range of −55° C. to +125° C. as illustrated in the flow chart of FIG. 4. Indeed, intercept and slope registers in calibration module 360 contain a constant b for the count when the temperature is −55° C. and a constant m for the ratio of counts to degrees. Constants b and m are determined empirically during a calibration, and in the foregoing example with the reference temperature T. equal 20° C., b would equal 625 and m would equal 5. The flow in FIG. 4 proceeds as follows. First, counter 330 and counter 340 are initialized at b and N, and output counter 370 has −55 loaded. Then the counters 330 and 340 start counting down oscillations of oscillators 310 and 320. Controller 350 monitors the count in counter 330 and when the count reaches 0, controller 350 loads counter 330 with m (which is stored in intercept and slope registers in calibration module 360). If the temperature is −55° C., then at this time counter 340 will reach 0 and stop counter 330 and the −55° C. entry in output counter 370 will be available as the temperature. However, if the temperature is greater than −55 ° C., then counter 340 has not yet reached 0 and counter 330 continues counting oscillations of temperature insensitive oscillator 310. When counter 330 again reaches 0, controller 350 adds 1 to output counter 370 (so the temperature entry is now −54° C.) and reloads counter 330 with m. This counting down from m repeats with an accompanying increment in output counter 370 until counter 340 reaches 0. When counter 340 reaches 0 the correct temperature will be in output counter 370, and the count in counter 340 reaching 0 signal drives output counter 370 to latch the temperature.

Once the count in counter 340 has reached 0, the next temperature measurement cycle could immediately begin or could be delayed and temperature sensitive oscillator 320 turned off to conserve power. Temperature insensitive oscillator 310 could provide a crude time keeping which triggers another measurement cycle as determined by controller 350.

The foregoing example with m equal to 5 does not provide much precision, but simply using a large N, such as 1,000,000, would increase m to about 5,000 and yield greater precision. Note that N equal to 1,000,000 means a measurement lasting on the order of 1 second for 1 MHz oscillators. However, the size of the counters may become awkward for large N, and nonlinearities previously ignored would no longer be negligible for a high precision situation. Once again, note this example is intended only to explain the relationship between various conditions and preferred tradeoffs between these conditions.

Figure 3B:
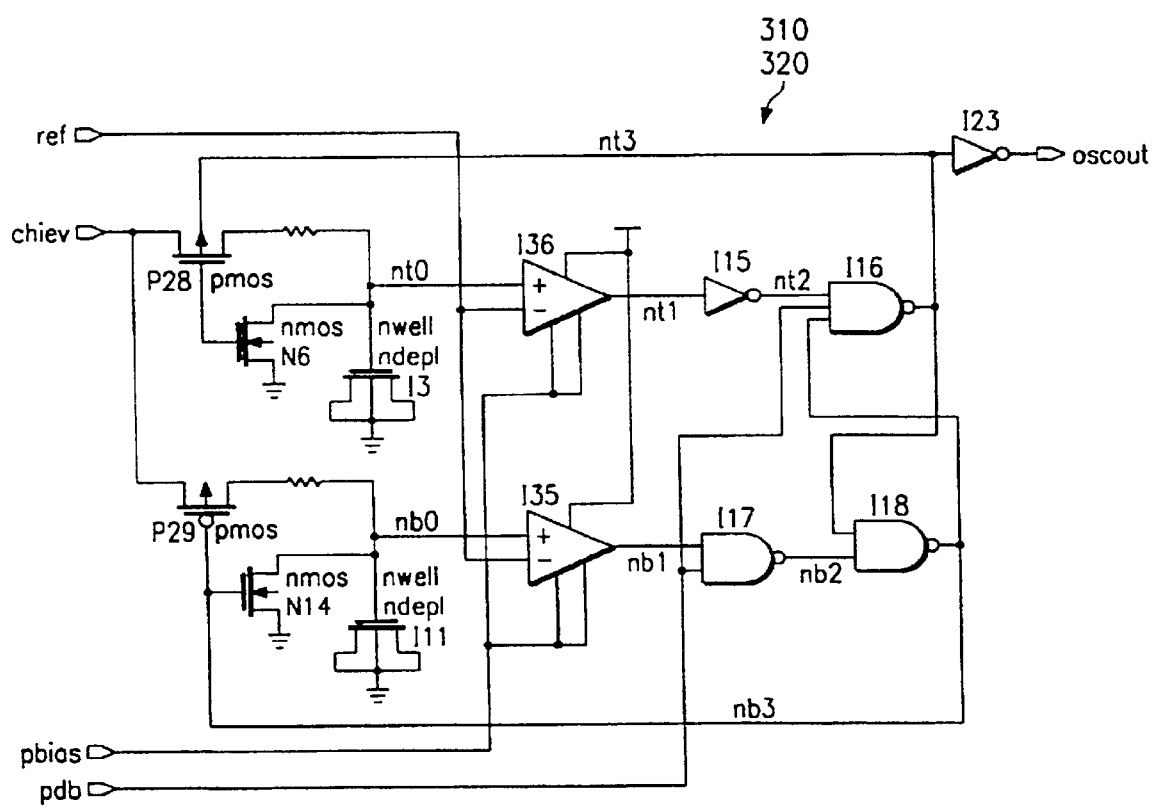
FIG. 3B is an illustration of an alternate embodiment of the oscillator used in FIGS. 2A and 2B.

FIG. 3B is an illustration of an alternate preferred embodiment of the oscillator used in FIGS. 2A and 2B.

Figure 3C:
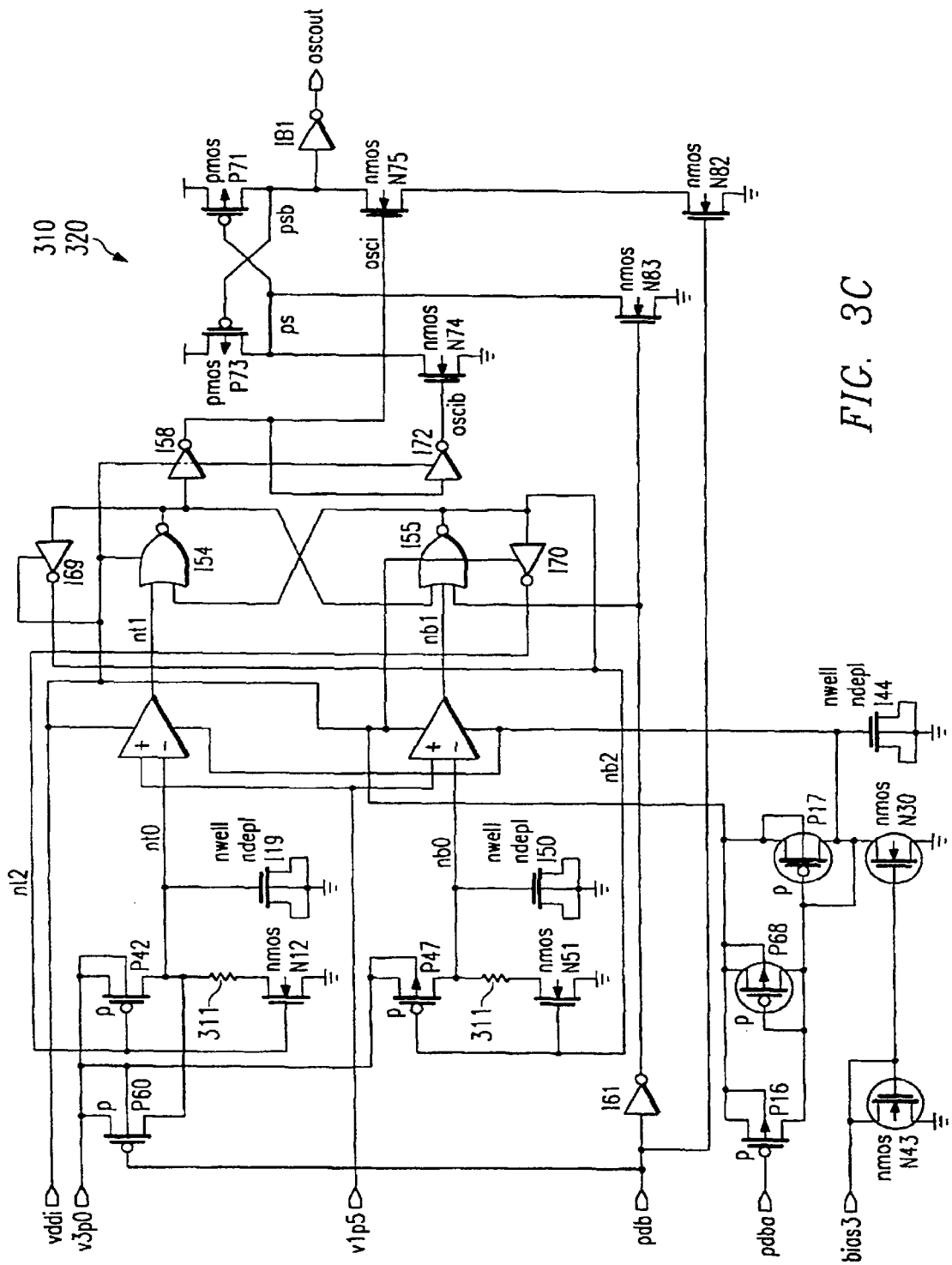
FIG. 3C is an illustration of an alternate embodiment of the oscillator used in FIGS. 2A and 2B.

FIG. 3C is a schematic of the illustration of the preferred embodiment of the oscillator used in FIGS. 2A, 2B, 2C, 3A, and 3B. As explained below, resistors 311 are comprised of different materials having different sensitivities to temperature (e.g., polysilicon and N-well embodiments), which provides the differences in the temperature coefficient (and, therefore, the difference in the sensitivity or dependence) of oscillators 310 and 320.

Preferred system embodiments and process implementations take into account a variety of factors that individually and collectively combine to produce errors associated with the output of the temperature in order to minimize these errors. Please note that each factor presents errors independent and in conjunction with other factors. As a result, solutions provided in preferred embodiments may account for these factors individually and collectively depending upon the particular circumstances involved. However, before we address these factors in more detail, please refer to FIG. 2D, which provides an even more detailed block functional/structural diagram of the preferred embodiment of temperature detector 200, which includes the calibration circuitry discussed above, generally denoted by reference numeral 600 in FIG. 2D. Temperature detector 600 comprises a low temperature coefficient oscillator 610 (about 200 KHz), high temperature coefficient oscillator 620 (about 100–200 KHz), 15-bit down counter 630, 2-to-1 multiplexer 632, 13-bit down counter 640, controller 650, intercept and slope registers 660, accumulator 662, output temperature register 670, and prescaler 680 (made of temperature iteration register 681, counter 683, and fractional down counter 685). Each of the down counters has a comparator for indicating when the count reaches 0, counter 683 has a comparator for indication when the count reaches 125 (the maximum temperature). The contents of output temperature register 670 are in 9-bit two's complement format with the least significant bit (LSB) representing 0.5° C. Thus output temperature register 670 can hold numbers between −128.0 and +127.5, but the temperature contents will always be in the range of −55 to +125. Monitoring the operation of temperature detector 600 at three different temperatures provides calibration and leads to trimming of the operation parameters Base Count, TC1, TC2, and Fraction. The Base Count and TC1 parameters roughly correspond to the b and m parameters of detector 300. In essence, detector 600 numerically integrates a quadratic temperature dependence starting from −55 and using Base Count as the initial value, TC1 as the initial slope and TC2 as the constant slope derivative.

Temperature detector 600 utilizes quadratic approximations as follows. Low temperature coefficient oscillator 610 and high temperature coefficient oscillator 620 have the architecture shown in FIG. 4 and emulate oscillators 310 and 320 in that low temperature coefficient oscillator 610 has a polysilicon resistor with resistance about 100 Kohms and high temperature coefficient oscillator 620 has a diffused resistor with resistance roughly 440 Kohms. The resistance of the oscillator resistors is presumed to have a quadratic temperature dependence over the range −55° C. to +125° C. The propagation delay through the comparator and flip-flop may also be presumed to have quadratic temperature dependence because this closely fits SPICE simulation results. Thus the oscillation period of each oscillator is quadratic in temperature, and the number of oscillations by low temperature coefficient oscillator 610 in a time period determined by high temperature coefficient oscillator 620 oscillating a fixed number of times is the ratio of two quadratic functions of temperature. Temperature detector 600 has two modes of approximating this ratio of quadratics: (1) an overall quadratic fit and (2) the numerator quadratic plus an iterative mode with a linear fit for the denominator quadratic. The following paragraphs discuss the two modes of operation.

The first mode of operation does not employ prescaler 680 and is analogous to the operation of temperature detector 300. First, for calibration the total number of oscillations of low temperature coefficient oscillator 610 during a count down from $2^{13}$ to 0 by 13-bit down counter 640 is assessed at three different temperatures (such as 10°, 50°, and 90° C.). Then these three data points provide for a quadratic fit for the total number of counts as a function of temperature. That is, the total number of counts during a count down from $2^{13}$ is approximately in EQUATION 6C:

$$M(T) = C_0 + C_1 T + C_2 T^2 \qquad \text{EQUATION 6C}$$

Thus substituting in T equal to −55 will give M(−55) as the Base Count (corresponding to b in temperature detector 300), and substituting T equal to −55 in the derivative M'(T)=$C_1$+2$C_2$T gives M'(−55)=TC1 which is the slope at −55 (corresponding to "m" in detector 300). The slope increment TC2 is just 2$C_2$.

Once the parameters Base Count, TC1, and TC2 have been determined and loaded into registers, the first mode of operation of temperature detector 600 proceeds as follows. 13-bit down counter 640 has $2^{13}$ loaded and 15-bit down counter 630 has Base Count loaded by 2-to-1 multiplexer 632 selecting Base Count rather than the contents of intercept and slope register 660 (which has TC1 loaded), and −55 is loaded in output temperature register 670. Base Count may be on the order of 9000, the slope TC1 may be on the order of 50, and the slope increment may be on the order of 0.2. To avoid roundoff errors, TC1 and TC2 are expressed to an accuracy of 1/128 (7 fractional binary bits) and sums are truncated when loaded in 15-bit down counter 630. Oscillators 610 and 620 then drive down counters 630 and 640, respectively. When 15-bit down counter 630 reaches 0, controller 650 switches 2-to-1 multiplexer 632 to load TC1 (the then-current contents of intercept and slope register 660) into 15-bit down counter 630 which starts counting down again. After loading TC1 from intercept and slope register 660 into 15-bit down counter 630, controller 650 drives intercept and slope register 660 to replace its contents TC1 with the sum TC1+TC2 from accumulator 662. Then when 15-bit down counter 630 again reaches 0, controller 650 increments the −55 in output temperature register 670 and again loads the contents of intercept and slope register 660 (now TC1+TC2) into 15-bit down counter 630, which continues counting down. As with temperature detector 300, each time counter 15-bit down counter 630 reaches 0, controller 650 increments the temperature in output temperature register 670 and drives intercept and slope register 660 to increment its contents by TC2. Thus the contents of intercept and slope register 660 increase to reflect the quadratic approximation, and the successive countdowns by counter 630 slowly increase. Because TC2 is added up to 180 times, the 1/128 accuracy suffices. Also as with temperature detector 300, once 13-bit down counter 640 has counted down from $2^{13}$, the incrementing of the temperature in output temperature register 670 ceases and register 670 contains the temperature output.

A comparison of the contents of 15-bit down counter 630 to the contents of intercept and slope register 660 when 13-bit down counter 640 reaches 0 provides the 0.5 degree bit. In particular, if the contents of 15-bit down counter 630 is less than half that of intercept and slope register 660, then the 0.5 degree bit is added to output temperature register 670.

The second mode of operation of temperature detector 600 uses prescaler 680 to provide a more accurate approximation and to permit iteration to achieve this approximation with minimal hardware. Essentially, the period of high temperature coefficient oscillator 620 is again approximated by a quadratic and determines the Base Count, TC1, and TC2; and the period of low temperature coefficient oscillator 610 is approximated by a linear temperature function and is used to block some of the oscillations from low temperature coefficient oscillator 610 from being counted by 15-bit down counter 630. Indeed, prescaler 680 operates as follows. First, the stream of oscillations from low temperature coefficient oscillator 610 is partitioned into groups by repetitively counting down in fractional down counter 685 from a parameter Fraction to 0; that is, the oscillations are partitioned into groups of size Fraction. Then at the start of each such group of oscillations, counter 683 begins counting up from the current temperature iteration stored in temperature iteration register 681 to +125, and while counter 683 counts up, its comparator output is low and feeds AND gate 687 to block the oscillation stream from 15-bit down counter 630. The temperature thus computed from the nonblocked oscillations appears, as in the overall quadratic approximation description, in output temperature register 670; and controller 650 then loads this temperature into temperature iteration register 681 to become the next temperature iteration for counter 683.

In more detail, during one temperature measurement cycle, 13-bit down counter 640 counts down from $2^{13}$ and low temperature coefficient oscillator 610 and high temperature coefficient oscillator 620 have periods $t_{LO}(T)$ and $t_{HI}(T)$, respectively, so oscillator 610 generates $2^{13} t_{HI}(T)/t_{LO}(T)$ oscillations during the cycle. Note that subscript LO indicates low temperature dependence and HI indicates high temperature dependence. Now if $t_{LO}$ were independent of temperature and $t_{HI}(T)$ had exactly quadratic temperature dependence, then the counting down by 15-bit down counter 630 with Base Count and TC1 and TC2 would give an exact temperature in output temperature register 670.

The quadratic approximation for $t_{HI}(T)$ is good, but $t_{LO}(T)$ increases with temperature by roughly 15% over the range −55° C. to +125° C. for a polysilicon resistor in low temperature coefficient oscillator 610. Indeed, $t_{LO}(T)$ may be linearly approximated by $t_{LO}$ (125) [1-α(125-T)] where, as before, α is the temperature coefficient of resistivity for polysilicon and roughly equal to 850 ppm/° C. Then, preferred embodiments determine Base Count, TC1, and TC2 from the quadratic $2^{13}\,t_{HI}(T)/t_{LO}(125)$ and use prescaler 680 to block a number of oscillations to compensate for the use of $t_{LO}(125)$ instead of $t_{LO}(T)$. Because counter 683 plus AND gate 687 block 125-T oscillations for each group of oscillations of size Fraction, α determines Fraction as follows. First, the number of oscillations passed by prescaler 680 during one measurement cycle is, disregarding the granularity due to Fraction shown in EQUATION 6D:

$$[1-((125-T)/\text{Fraction})][2^{13}t_{HI}(T)/t_{LO}(T)] \qquad \text{EQUATION 6D}$$

Referring to EQUATION 6C, Substituting in the linear approximation for $t_{LO}(T)$ and rearranging yields in EQUATION 6E:

$$\{[\text{Fraction}-(125-T)]/\text{Fraction}\}2^{13}t_{HI}(T)/t_{LO}(125)$$
$$\alpha(1/\alpha-(125-T)) \qquad \text{EQUATION 6E}$$

Thus, taking Fraction to equal 1/α (on the order of 1200), the number of oscillations passed just equals $2^{13}t_{HI}(T)/t_{LO}(125)$, which is quadratic with the Base Count, TC1, and TC2 as used before.

The foregoing only presumed temperatures to the nearest degree, but the same procedure works for greater resolution. In particular, for a half-degree resolution, an extra bit would appear in the temperature from temperature iteration register 681, counter 683 would be counting in half-degrees, and Fraction would be doubled.

Because counter 683 uses the temperature during computation of the temperature by down 15-bit down counter 630, successive approximation iterations must be used. Take +35 (the midpoint of –55 and +125) as a zeroth order approximation output temperature to load into temperature iteration register 681 and then compute a first order approximation output temperature, $T_1$, in output temperature register 670 by a first measurement cycle. Controller 650 then puts $T_1$ into temperature iteration register 681 and a second measurement cycle uses $T_1$ to compute a second order approximation $T_2$ in output temperature register 670. Controller 650 iterates five times to yield the final output temperature. FIGS. 2E–2F graphically illustrate the successive approximations in general. Indeed, if the temperature is T, point A in FIG. 2F indicates the number of oscillations from low temperature coefficient oscillator 610, and point B indicates the number passing through to 15-bit down counter 630 due to the use of+35 in temperature iteration register 681. B falls below the desired curve because too many oscillations are blocked due to the zeroth approximation, +35, being too low. The first order approximation temperature, $T_1$, computed in output temperature register 670 follows from point C on the desired curve as shown in FIG. 2F. This implies a smaller fraction to be blocked in during the second measurement cycle as indicated by FIG. 2E, and point D indicates the number passing through to counter 630 in FIG. 2E. The second order approximation temperature, $T_2$, computed in output temperature register 670 follows from point E on the desired curve as shown in FIG. 2E. For temperatures below +35, the successive approximations are analogous but converge to T from above the desired curve.

Figure 5:
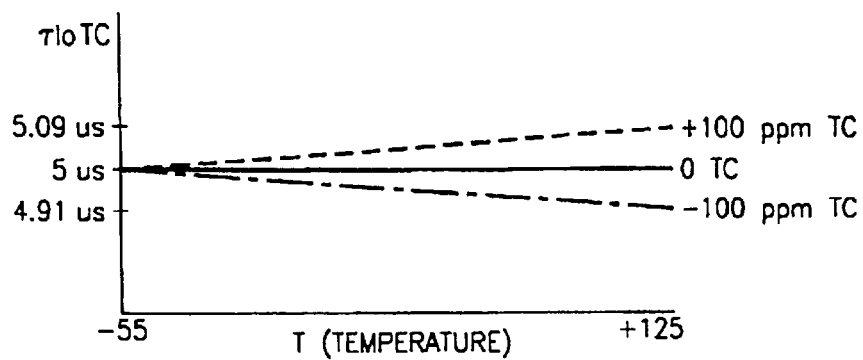
FIG. 5 is a graph showing the low TC period variance "0" TC oscillator 310 (in FIG. 2A) or 210 (in FIG. 2B)

Returning again to the individual factors that may introduce or contribute to temperature readings of preferred system embodiments, one factor that should be considered "0" TC oscillator 310 or 320 (in FIGS. 2A and 2B respectively) is actually a low TC oscillator. The best low TC oscillator available is "zero" tempco poly, which is specified to actually have a temperature coefficient of ±100 ppm. This produces an especially difficult problem in that the denominator EQUATION 1 is not constant and the count output becomes a nonlinear function of temperature, which is extremely difficult and time-consuming to predict and calculate. FIG. 5 is a graph showing the low TC period variance of "0" TC oscillator 310 or 320 (in FIGS. 2A and 2B respectively). This is the reason prescaler 680 is necessary and, therefore, preferred.

Figure 6:
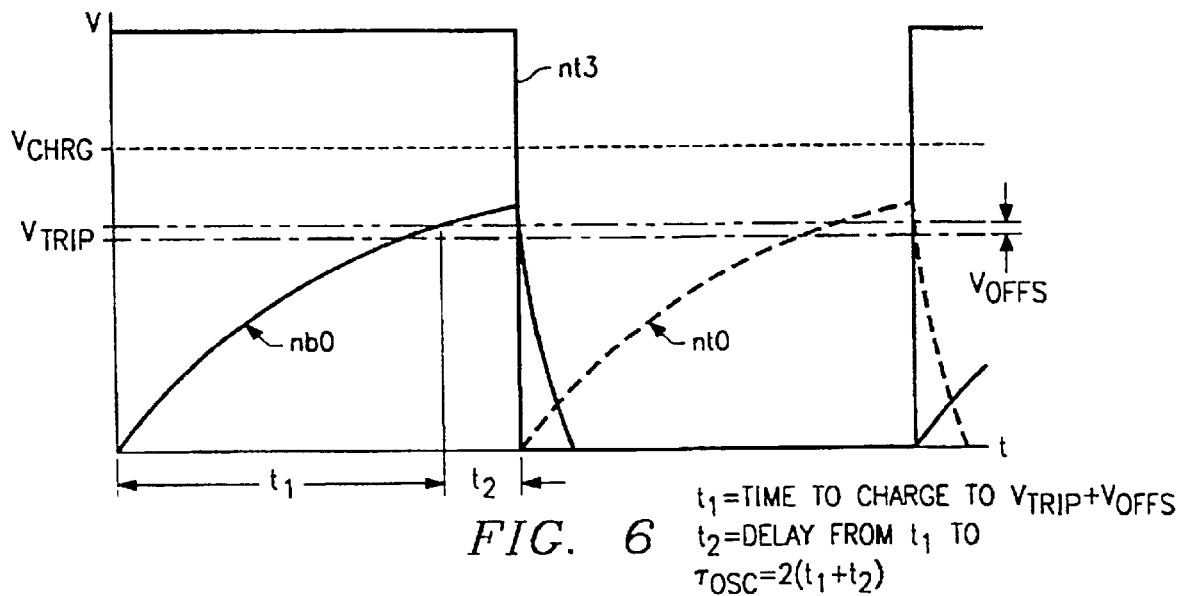
FIG. 6 is a graph showing that when an RC time constant is being used to generate the timing for an oscillator (shown in FIG. 3B), the capacity charges to a trip voltage (ref)

In addition, another factor to be considered is temperature dependent circuit delays in TC oscillators 310 and 320 (in FIG. 2A) and in temperature insensitive oscillator 310 and temperature sensitive oscillator 320 (in FIG. 2B) that diminish the control the resistance variance has over the overall temperature characteristic. FIG. 6 shows that when an RC time constant is being used to generate the timing for an oscillator (shown in FIG. 3B), the capacitor charges to a trip voltage (ref). Ideally, at this point (t1) the output of the oscillator would immediately switch. However, because some amount of overdrive of the comparator is necessary and since there is some delay in the switching time of the digital circuitry in the oscillator, there is an additional time t2 before the output switches. Also, there is some offset in the comparator (Voffs) that may be temperature dependent. The delay t2 varies with temperature in a different manner than the resistors r1 and r2, and is potentially dependent on supply voltage. The overall temperature variance of t1+_t2 is therefore more difficult to fit.

Figure 7:
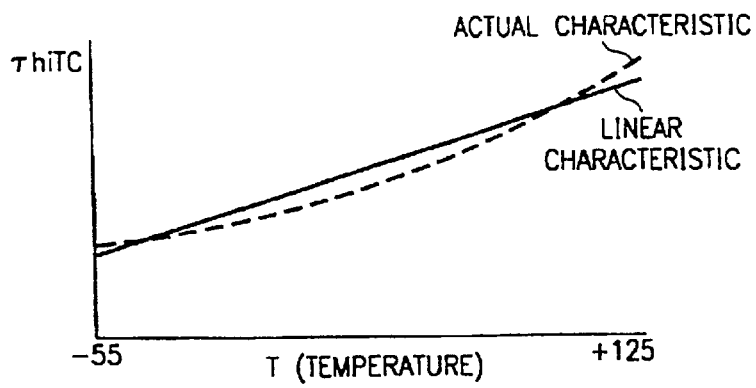
FIG. 7 is a graph illustrating the resistor nonlinear variance with temperature.

Moreover, another factor to be considered is the resistors used to set the tempcos of the oscillators have non-zero second order temperature coefficients. This is especially true in the case of the n-well resistor, which has a second order tempco in the neighborhood of 14 ppm. This alone effectively rules out a linear fit of the counter in order to get the desired accuracy. FIG. 7 is a graph illustrating the resistor nonlinear variance with temperature.

Yet another factor to be considered is the fact it is crucial to know precisely the temperature at which a trim reading is done on the sensor. Effort must be taken to make this measurement as accurately as possible at a test stage.

Another consideration is the fact resistor values must stay exactly stable over device lifetime. Even small variations in resistance value will greatly upset the sensor accuracy. Therefore, preferred embodiments use resistors that have an acceptably small resistance drift.

Finally, the Temperature value must not vary for varying values of $V_{DD}$.

As discussed above, all of these factors are individually and collectively addressed in preferred embodiments of temperature detector 200, shown in FIG. 1, as verified by the following explanation, which uses a ratio of two time periods: one having a relatively large temperature variance and one having a relatively small temperature variance. The large temperature variance discussed above can be adequately fit or estimated using second order curve matching techniques. Thus, as discussed above, preferred embodiments (and the corresponding explanation that follows) takes into account the following sources of error in this system:

1. Tempco of the resistor intends to have zero tempco.
2. Drift of the offset of a comparator and change in delay through the oscillator with temperature.
3. Second order temperature effects on resistor values.
4. Error in reading temperature while trimming values.

5. Change in resistor sheet rho and tempcos over life.

6. The Temperature value must not vary for varying values of $V_{DD}$.

Note that the offset of the comparator could vary in either direction, the direction chosen will be the one to maximize potential errors.

Scale factors are shown in EQUATIONS 7A–7H.

$\mu := 10^{-6}$  pF$:= 10^{-12}$ farad  j$:= 1$ ns$:= 10^{-9}$ sec  k$:= 1$
granularity$:= 2$  number of tics per deg C. (resolution).

$$\text{step} := \frac{1}{\text{granularity}} \quad \text{temperature step size.}$$

gn$:=$ granualrity  abbreviation for granularity variable.
Tempcos and sheet rhos are shown in EQUATIONS 8A–8P.
Note: Minimum tempcos for hi TC material, maximum for lo TC material (this maximizes possible error).

EQ. 8A $\quad TC1_{loTCpolyj} := \dfrac{100}{10^6}$

EQ. 8B $\quad TC2_{loTCpoly} := \dfrac{1.2}{10^6}$    lo TC poly parameters.

EQ. 8C $\quad \rho_{loTCpoly} := 126 \cdot \text{ohm}$

EQ. 8D $\quad TC1poly_j := \dfrac{800 \div 0 \cdot j}{10^6}$

EQ. 8E $\quad TC2_{poly} := \dfrac{.4}{10^6}$    standard poly parameters.

EQ. 8F $\quad \rho_{poly} := 29.4 \cdot \text{ohm}$

EQ. 8G $\quad TC1_{nwellj} := \dfrac{4683 + 600 \cdot j}{10^6}$

EQ. 8H $\quad TC2_{nwell} := \dfrac{14.3}{10^6}$    n-well parameters.

EQ. 8I $\quad \rho_{nwell} := 388.5 \cdot \text{ohm}$
EQ. 8J $\quad \text{perr}_{hiTC} := 0$
EQ. 8K $\quad \text{tclerr}_{hiTC} := 0$    percent errors due to life drift - hi TC material.
EQ. 8L $\quad \text{tc2err}_{hiTC} := 0$
EQ. 8M $\quad \text{perr}_{loTC} := 0$
EQ. 8N $\quad \text{tclerr}_{loTC} := 0$    percent errors due to life drift - lo TC material.
EQ. 8O $\quad \text{tc2err}_{loTC} := 0$
EQ. 8P $\quad TC_{offs} := 30\mu \cdot \text{volt}$    comparator offset drift.

The delay ($t_2$ in the accompanying FIG. 6) due to necessary overdrive and gate delays varies with temperature. The following effective tempco for this delay is computed from data gathered from SPICE simulations. A second order fit is used because the variance of this delay with temperature is nonlinear. Here are the delays associated with various process corners (Vcc=3.5 V, temperatures −55, −10, 25, 55, 90, 125):

$l := 0, 1 \ldots 5$    ...index variable delay_wnwp$_l$ :=

| 141.3·ns |
| 138.0·ns |
| 133.9·ns |
| 130.8·ns |
| 126.6·ns |
| 122.0·ns | delay_tntp$_l$ :=

| 101.4·ns |
| 99.7·ns |
| 96.9·ns |
| 94.5·ns |
| 91.6·ns |
| 87.8·ns | delay_bnbp$_l$ :=

| 75.8·ns |
| 74.7·ns |
| 72.6·ns |
| 71.1·ns |
| 68.7·ns |
| 66.5·ns | delay_wnbp$_l$ :=

| 87.4·ns |
| 86.3·ns |
| 84.2·ns |
| 82.2·ns |
| 79.9·ns |
| 76.8·ns | delay_bnwp$_l$ :=

| 122.9·ns |
| 120.2·ns |
| 116.8·ns |
| 113.5·ns |
| 109.9·ns |
| 105.3·ns |

In this section a function is best fit to the SPICE data so that it may be included in the oscillator period calculations at all temperatures.
Process corner for this run showing in following EQUATIONS 9A–9F:

$\text{delay}_l := \text{delay\_wnwp}_l$    Equation 9A
$\text{Tdelay}_l :=$ $\begin{bmatrix} 125 \\ 90 \\ 55 \\ 25 \\ -10 \\ -55 \end{bmatrix}$ $T_{top} := 125$
$T_{bottom} := -55$ $\text{numpts} := (T_{top} - T_{bottom}) \cdot \text{gn} \ldots$
number of iteration points for the temperature sensor.

$$D := \begin{bmatrix} 1 & Tdelay_0 & (Tdelay_0)^2 \\ 1 & Tdelay_1 & (Tdelay_1)^2 \\ 1 & Tdelay_2 & (Tdelay_2)^2 \\ 1 & Tdelay_3 & (Tdelay_3)^2 \\ 1 & Tdelay_4 & (Tdelay_4)^2 \\ 1 & Tdelay_5 & (Tdelay_5)^2 \end{bmatrix} \quad N := \begin{bmatrix} delay_0 \\ delay_1 \\ delay_2 \\ delay_3 \\ delay_4 \\ delay_5 \end{bmatrix}$$

Figure 8:
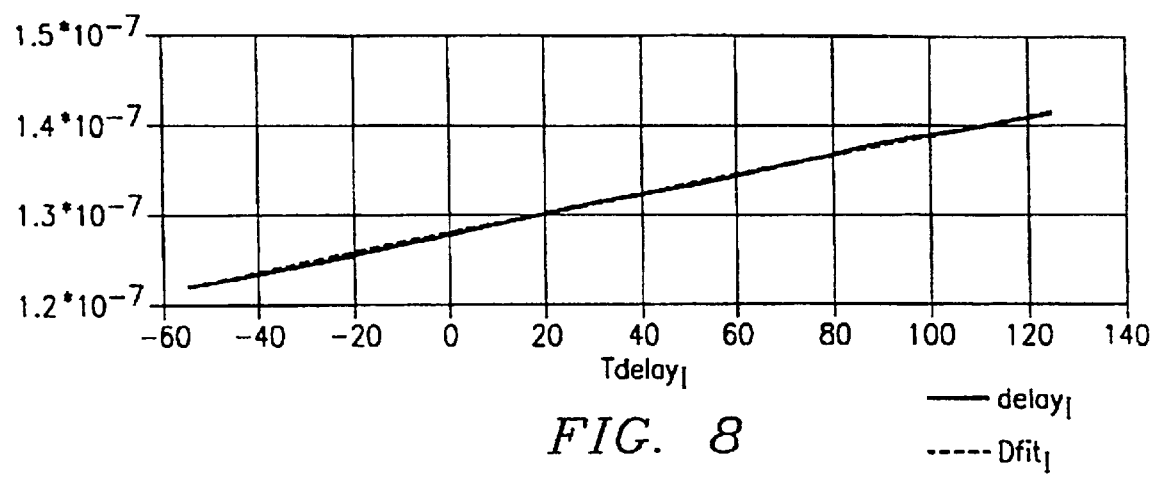
FIG. 8 is a graph showing the resulting quadratic over the time of the delay.

EQ 9B    Equation 9B $(M = (D^T D))^l D^T N$    Equation 9C $\widetilde{Dfit}_l = M_0 \cdot M_1 Tdelay_l + M_2(Tdelay_l)^2$    Equation 9D $M = \begin{bmatrix} 127.9694 \\ 0.10987 \\ -1.59634 \cdot 10^{-5} \end{bmatrix} = ns$    Equation 9E $\widetilde{Dfit} = \begin{bmatrix} 141.45394 \\ 137.72855 \\ 133.96405 \\ 130.70621 \\ 126.86908 \\ 121.87816 \end{bmatrix} \cdot ns$    Equation 9F FIG. 8 is a graph showing the resulting quadratic over the time of the delay.

Oscillator period calculations are shown in the following equations 10A–10W:

embodiments, however, may make these tradeoffs differently, depending upon the application, but do not depart from the system architecture outline outlined here and below.

| | | |
|---|---|---|
| Equation 10A | $T_{nom} = 25$ | nominal temperature at which resistor sheet rho is computed. |
| Equation 10B | $V_{chrg} + 3.6$ volt | charging supply for oscillator RC. |
| Equation 10C | $V_{trip} = 1.8$ volt | trip level for oscillator RC. |
| Equation 10D | $C_{loTC} = 22.585$ pF | lo TC oscillator capacitance. |
| Equation 10E | $Sq_{loTC} = 2500$ | no. of squares in lo TC oscillator resistor. |
| Equation 10F | $P_{loTC} = P_{poly}$ | nominal sheet rho of lo TC material. |
| Equation 10G | $C_{hiTC} = 22.585$ pF | hi TC oscillator capacitance. |
| Equation 10H | $Sq_{hiTC} = 550$ | no. of squares in hi TC oscillator resistor. |
| Equation 10I | $\rho_{hiTC} = P_{nwell}$ | nominal sheet rho for hi TC material. |
| Equation 10J | $TC1_{loTC_j} = TC1_{poly_j}\ TC2_{loTC}: = TC2_{poly}$ | lo TC resistor material choice. |
| Equation 10K | $TC1_{hiTC_j} = TC1_{nwell_j}\ TC2_{hiTC}: = TC2_{nwell}$ | hi TC resistor material choice. |
| Equation 10L | $i := 0, 1 \ldots$ numpts | index variable. |
| Equation 10M | $T_i = T_{bottom} + i$ step | temperature sweep. |
| Equation 10N | $RloTC_{i,j} = sq_{loTC}\ \rho_{loTC}[1 + TC1_{loTC_j}(T_i) + TC2_{loTC}T_i)^2]$ | to TC resistance Value |
| Equation 10O | $RloTC_{i,j} = sq_{loTC}\ \rho_{loTC}[1 + TC1_{loTC_j}(T_i) + TC2_{loTC}T_i)^2]$ | to TC resistance Value |
| Equation 10P | $Voffs: = TC_{offs}$step | comparator offset variation with temperature |
| Equation 10Q | $t1loTC_{i,j} = \left(\ln\left(1 - \frac{V_{trip} + Voffs_j}{V_{chrg}}\right)\right)RloTC_{i,j}C_{loTC}$ | computation of RC time to reach Vtrip + Voffs. |
| Equation 10R | $t2loTC_{i,j} = M_0 + M_1T_1 + M_2(T_i)^2$ | delay between reaching abc voltage level and oscillator switching. |
| Equation 10S | $tloTC_{i,j}: = 2(t1loTC_{i,j} + t2loTC_{i,j})$ | total time for one period |
| Equation 10T | $t1hiTC_{i,j} = \left(\ln\left(1 - \frac{V_{trip} + Voffs}{V_{chrg}}\right)\right)RhiTC_{i,j}C_{hiTC}$ | computation of RC time to reach Vtrip + Voffs |
| Equation 10U | $t2hiTC_{i,j} = M_0 + M_1T_1 + M_2(T_i)^2$ delay between reaching above voltage level and oscillator switching. | |
| Equation 10V | $thiTC_{i,j} = 2(t1hiTC_{i,j} + t2hiTC_{i,j})$ total time for one period. | |
| Equation 10W | $thiTC_{i,j} = 5.27937\ \mu sec\ tloTC_{i,j} = 2.44656\ \mu sec$ minimum oscillator periods. | |

Figure 9:
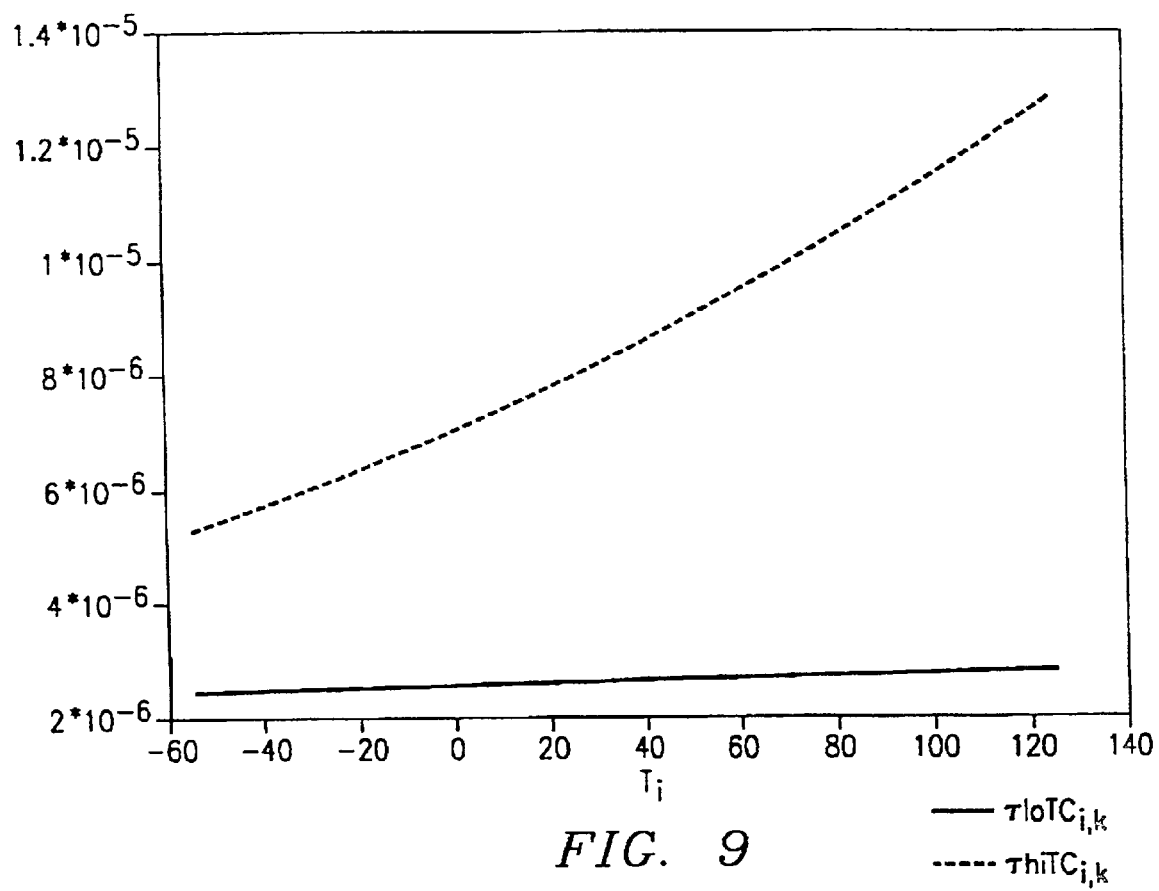
FIG. 9 is a graph illustrating the curvature in the temperature characteristic of the ((High ("hi") Temperature Coefficient ("TC") Oscillator ("OSC")) hi TC Oscillator 310 (e.g., or temperature-independent oscillator 310 (in FIG. 2A) or temperature insensitive oscillator 310) (in FIG. 3A) and TC Oscillator 320 (e.g., or temperature-dependent oscillator 320 (in FIG. 3A) or temperature sensitive oscillator 320) (in FIG. 3B)

Note here the tradeoff between accuracy and time of conversion. In order to minimize the effect of the delay (which is near 150ns worst case), it is better to use a long RC time constant. However, this lengthens the conversion time, which is undesirable. The other way to improve matters is to reduce the delay, but at best case processing, the current consumed is already at the maximum. While it is very difficult to make this circuit operate with enough speed to maintain accuracy at low $V_{cc}$ (e.g., $V_{cc}=2.7V$) while maintaining low current (e.g., $<500\ \mu a$) at high $V_{cc}$, which is why the minimum $V_{cc}$ specification was raised to 3.5V, numerous modifications can be made to reduce power, so that 2.7V is sufficient for operation purposes. For instance, power can be used that normally enhances circuitry used to enhance precision, conversion speed, or low power will have to be sacrificed. As a result, tradeoffs among these three items exist in preferred embodiments. Alternate preferred FIG. 9 is a graph illustrating the curvature in the temperature characteristic of the hi TC oscillator 320 (in FIG. 3A) and temperature sensitive oscillator 320 (in FIG. 3B).

Next, compute the counts of the actual system and normalize the error at each temperature to an LSB, as indicated in the following equations 11A–11B.

| | | |
|---|---|---|
| Equation 11A | $n = 13$ | number of bits in the prescale counter clocked by the hi TC oscillator. The size of n is determined by the relative periods of the two oscillators and the desired precision. A minimumn number of counts in the main counter per temperature step must be assured. A trial and error method was used to find the smallest number for n that yields an acceptable error figure. |
| Equation 11B | $count_{i,j} = \dfrac{thiTC_{i,j}2^n}{tloTC_{i,j}}$ | output of the counter at each temperature |

Figure 19A:
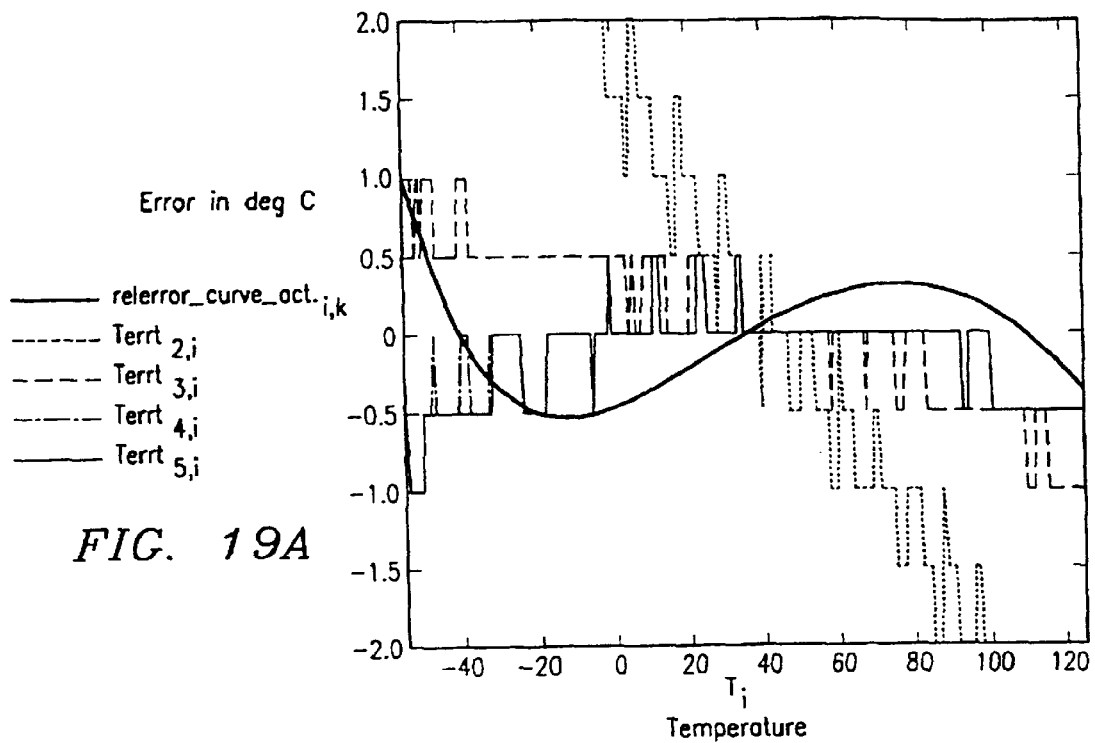
FIGS. 19A–19C are graphs of temperature sensor error vs. iteration for each iteration compared to second order fit of count approach.
Figure 19B:
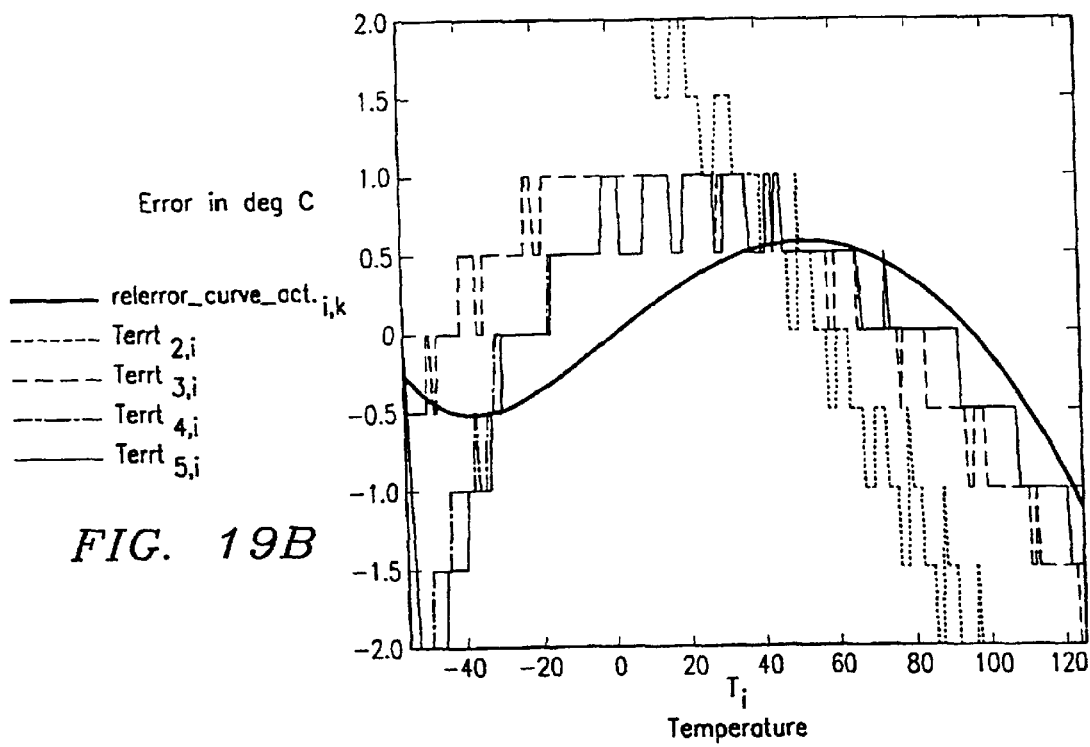
Figure 19C:
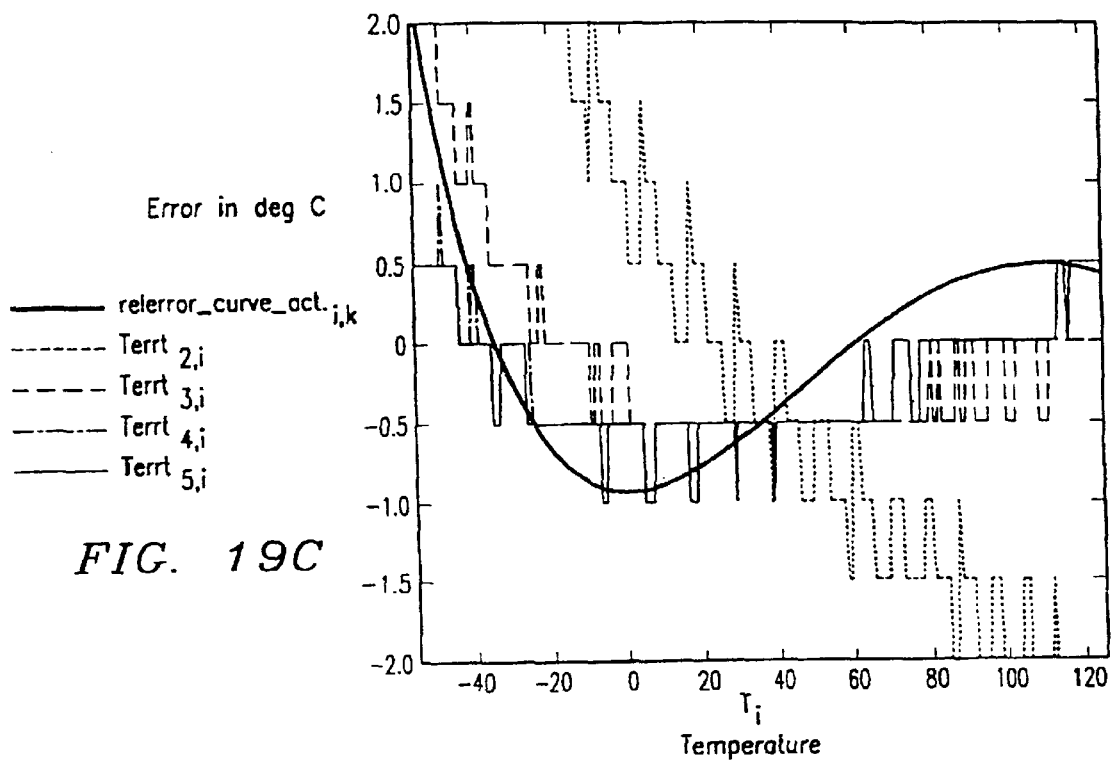
Figure 19D:
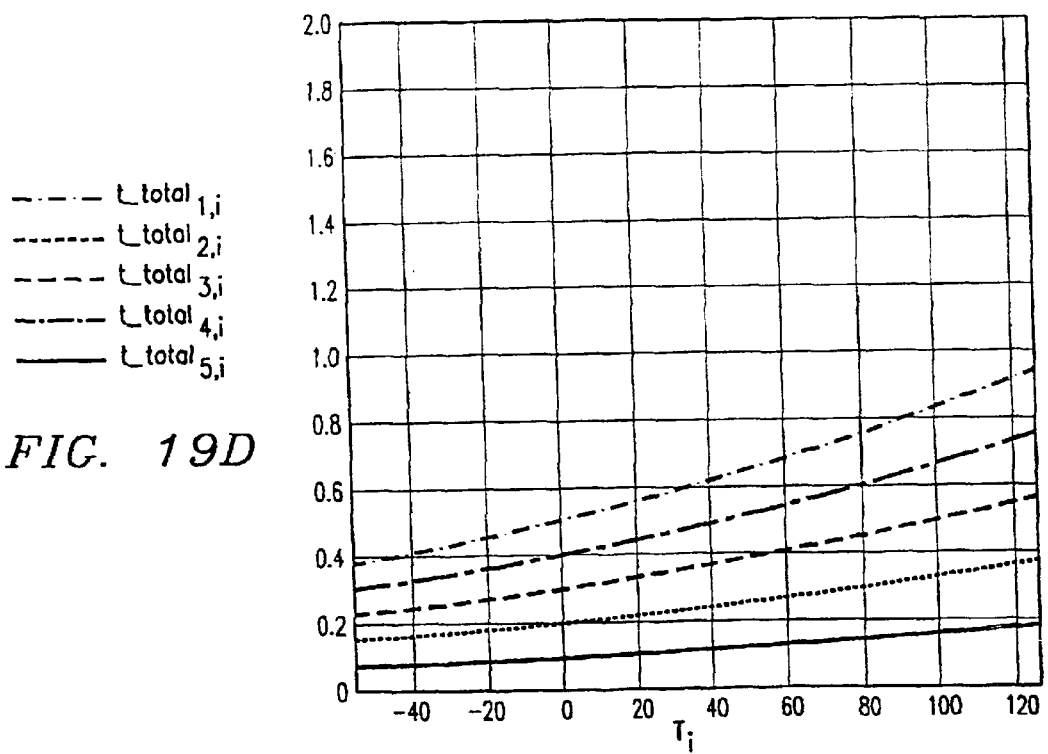
FIG. 19D is a graph of temperature conversion times vs. temperature vs. number of iterations.

The implementation in preferred system embodiments can at best be a second order curve and would actually be fit better with a higher order since there is a second order function in the denominator. This section takes sample measurements at three temperatures and produces a least squares second order fit to these three points. Note that inaccuracy of temperature measurement at test is taken into account, which is illustrated in the graphs of error vs. temperature, as shown in FIGS. 19A–C. FIG. 19A has zero error, whereas FIGS. 19C and 19B show plus or minus ½ degree temperature measurement error.

The fit is done with respect to an index variable, which ease s the final computation of the values to be entered into the part. The variable i is zero at $T_{min}$ (-55 degrees C.), and increments once for each temperature step (which is 1/gn/ degrees C., where gN is number of steps per degrees C.). Finally, an error term is added to each variable to simulate possible drift of resistance and tempco values over life. Instead of adjusting the periods of the oscillators to model this, the fit values will be modified. See EQUATIONS 12A–12I.

Equation 12A  $T1_{bottom} := -40 \quad T1_{middle} := 35 \quad T1_{top} := 110$ measurement temperatures.

Equation 12B  $\Delta T_{error} := 0$ error in temperature measurement. This is the Teague Effect variable, it will be examined for errors of 0, -5, and +.5 deg. C.

Equation 12C  $i_{top} := (T1_{top} - T_{bottom})gn$

Equation 12D  $i_{middle} := (T1_{middle} - T_{bottom})gn$ index variable at each measurement point.

Equation 12E  $i_{bottom} := (T1_{bottom} - T_{bottom})gn$

Equation 12F  
$$A := \begin{bmatrix} 1 & i_{top} & i_{top}^2 \\ 1 & i_{middle} & i_{middle}^2 \\ 1 & i_{bottom} & i_{bottom}^2 \end{bmatrix}$$
matrix used to generate the best fit.

Equation 12G  $ytop_j := count_{i_{topj}} - \Delta T_{error}(count_{i_{top}+gn,j} count_{i_{topj}})$ Equation 12H  $ymiddle_j := count_{i_{middlej}} + \Delta T_{error}(count_{i_{middle}+gn,j} count_{i_{middlej}})$ actual measured counts including temperature error Equation 12I  $ybottom_j := count_{i_{bottomj}} = \Delta T_{error}(count_{i_{bottom}+gn,j} count_{i_{bottomj}})$ Note above that the temperature error is taken to be negative at the outside measurement points, and positive at the middle point. This serves to exaggerate the error at the temperature extremes, giving a worst case error situation, as shown in EQUATIONS 13A–13E.

Equation 13A  
$$y^{(1)} \begin{bmatrix} ytop_1 \\ ymiddle_1 \\ ybottom_1 \end{bmatrix}$$

Equation 13B  
$$y^{(1)} = \begin{bmatrix} 3.52206 - 10^1 \\ 2.58737 - 10^1 \\ 1.87796 - 10^1 \end{bmatrix}$$

Equation 13C  $c^{<1>} = (A^T A)^{-1} A^T y^{<1>}$

Equation 13D  
$$c^{(k)} = \begin{pmatrix} 1.76312 - 10^1 \\ 36.77961 \\ 0.05007 \end{pmatrix}$$
coefficients of the second order fit Equation 13E  $yc_{i,j} := (c^{<j>})_0 + (c^{<j>})_1 i + (c^{<j>})_2 i^2$
computation of second order graph (ideal).

Figure 10:
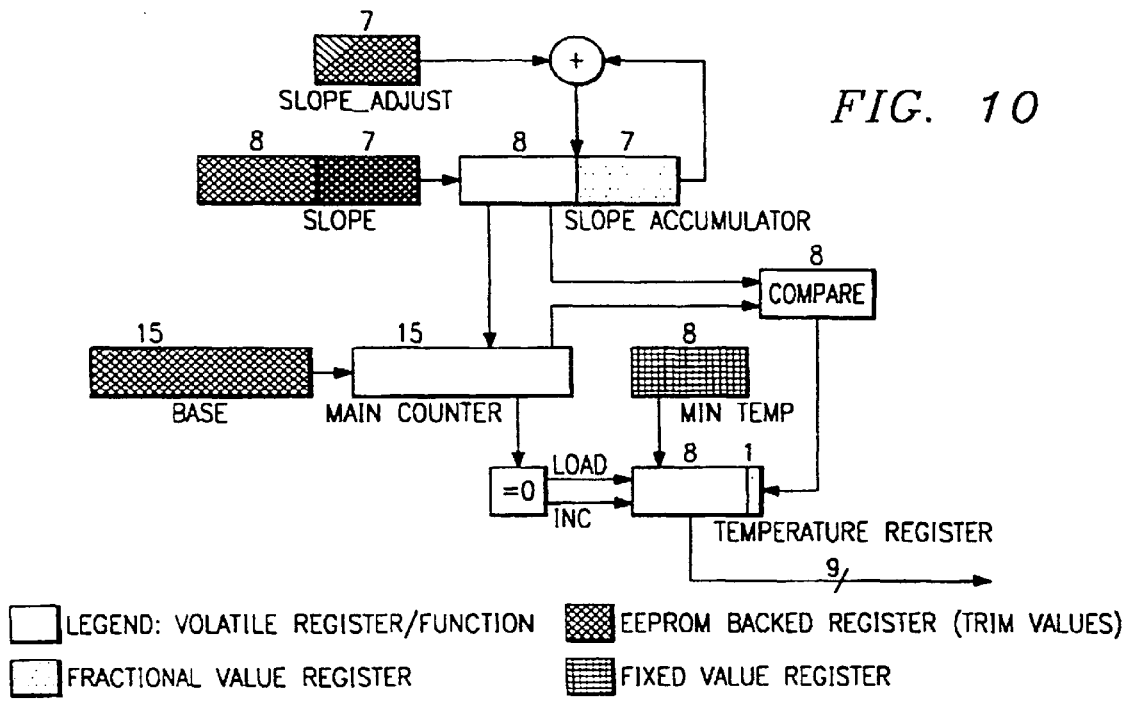
FIG. 10 is a block diagram of the second order curve fit described in the text for preferred temperature detector 200.
Figure 11:
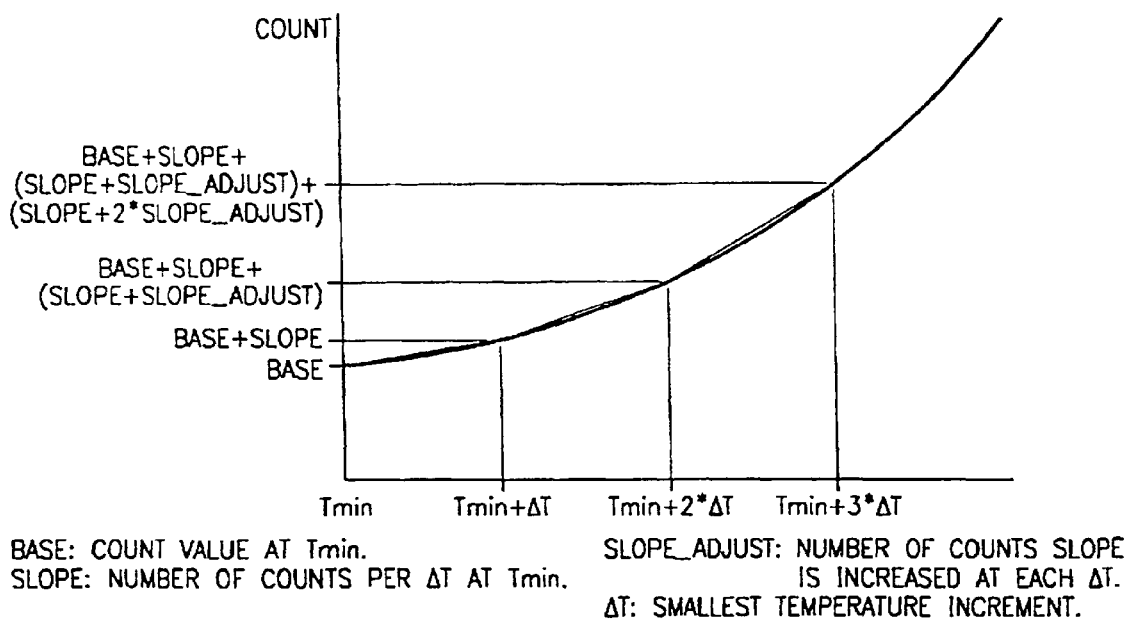
FIG. 11 is a graph showing the piecewise linear fit of count curve of the preferred temperature detector 200.

A block diagram of the design implementation for a second order curve fit is shown in FIG. 10. Instead of translating a final count value when the window, which corresponds to the temperature variable time delay closes to a temperature value, the temperature value is computed as the counter is operating. By programming three trim values into the part (base, slope, and slope_adjust—see FIG. 11) the curve may be defined and computed continuously during the conversion. The base value is the number of counts at the minimum temperature reading value, The slope is the number of counts to get from the base temperature to the next step in temperature. The slope_adjust variable modifies the slope at each temperature step—this generates the second order effect. Preferred circuit embodiments operate as follows. When a temperature conversion is requested, the base value is loaded into the main counter. The main counter then counts down and when the base count is exhausted, the part must be at least at the minimum temperature. The value Tmin is loaded into the temperature counter. At the same time, the value of the slope is loaded into both the main counter and the slope accumulator. The main counter counts down from this slope value, and while this continues, the slope_adjust is added to the slope accumulator in anticipation of the next temperature step. If the main counter gets to 0 again, the temperature must be at least the next step higher, so the temperature counter is incremented by 1 lsb. The value in the slope accumulator is dropped into the main counter and the counting continues. This procedure is repeated until the window generated by the hi TC oscillator and prescaler closes. Counting ceases and the remaining value in the temperature counter is the valid temperature.

Since a digital count is being used to represent a ratio of two analog values, the system is subject to rounding and quantization errors. For this reason, the lsb (number of counts per temperature step) must be a small or minimum number so that an error of a couple of counts will not cause an error in the temperature reading. In an effort to minimize this type of error fractional values are maintained for the slope_adjust, and slope accumulator, since, as is implied by the name, the error could accumulate for the slope value for high temperature values if these values are rounded to too few significant digits. This is especially true for the slope_ adjust value which is very small. In this case, nine binary fractional bits are used, values entered into the part for slope and slope_adjust will be rounded to ninth binary place. The variable "bin" is used to represent the number of binary places.

Figure 12:
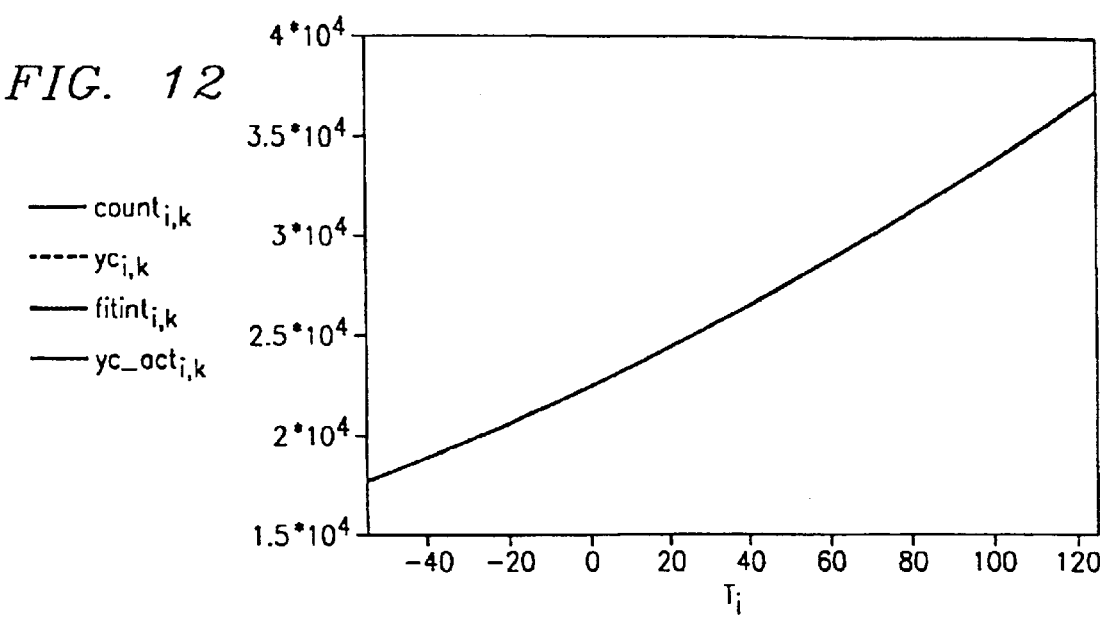
FIG. 12 is a graph showing the actual count (solid line), fitted count (dotted line) and quantized fitted count (dashed line) (which are practically on top of one another) vs. temperature.
Figure 13:
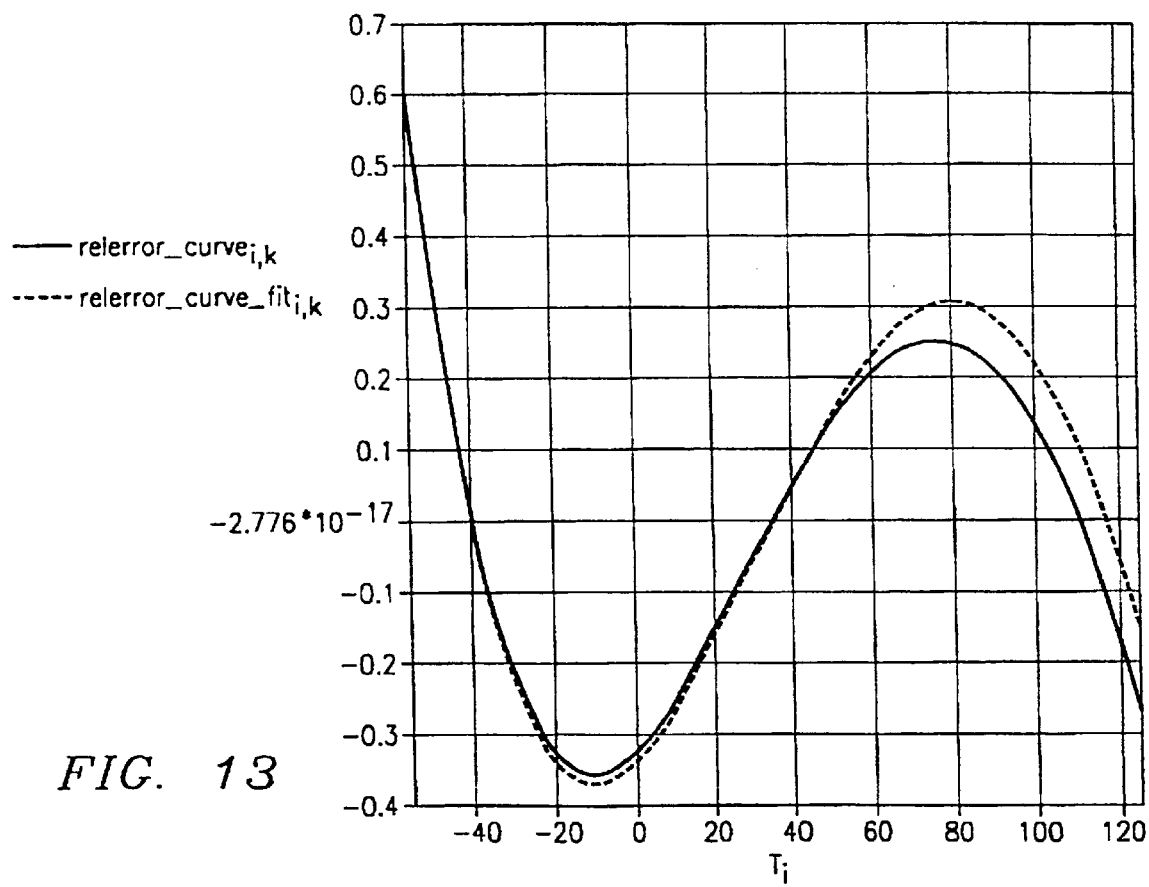
FIG. 13 is a graph showing the Error in Degrees C. of actual count from fitted count vs. temperature.

The following EQUATIONS 14A–14DD is the computation for the actual values entered into the part. The final value computed by the part for each step is truncated since the counter may count only on whole number boundaries. Also, the entered values are adjusted so that the point of minimum error due to rounding is at the center temperature. FIG. 12 is a graph showing the actual count (solid line), fitted count (dotted line) and quantized fitted count (dashed line) (which are practically on top of one another) vs. temperature. FIG. 13 is a graph showing the Error in Degrees C. of actual count from fitted count vs. temperature.

| | |
|---|---|
| Equation 14A | $p := 1, 2 \ldots \text{numpts}$   index variable starting at 1. |
| Equation 14B | $\text{bin} := 9$   number of binary fractional bits. |
| Equation 14C | $i_{ave} := \dfrac{\text{numpts}}{2}$ |
| Equation 14B | $i_{ave} := 180$   value of the index variable at the average temperature. |
| Equation 14E | $T_{ave} := T_{i_{ave}}$ |
| Equation 14F | $T_{ave} := 35$   average temperature. |
| Equation 14G | $\Delta T_{ave} := T_{ave} - T_{bottom}$ |
| Equation 14H | $\Delta T_{ave} := 90$ |
| Equation 14I | $\text{Slope\_Adjust}_j \; \text{floor} \dfrac{[[2(C^{(j)})_2 2^{bin}] : 5]}{2^{bin}}$ |
| Equation 14J | $\text{Slope\_Adjust}_k = 0.09961$   entered slope_adjust variable. |
| Equation 14K | $\text{slope}_{o,j} := \dfrac{\text{floor}[[(C^{(j)})_1 + 2(c^{(j)})_2(i_{ave})]2^{bin} + .5]}{2^{bin}} \ldots + (-\text{slope\_adjust})j i_{ave}$ |
| Equation 14L | $\text{slope}_{o,j} := 36.87305$   extrapolated and rounded slope variable (entered into the part.) |
| Equation 14M | $\text{slope}_{p,j} := \text{slope}_{p-1,j} + \text{slope\_adjust}_j$   slope at each temperature snap point. |
| Equation 14N | $\text{base}_j := \text{floor}\left[(yc_{i_{ave},j} - \text{slope}^j_{o,j\,ave}) - \dfrac{\text{slope\_adjust}_j}{2} i_{ave}(i_{ave} - 1)\right]$ |
| Equation 14O | $\text{base}_k = 1.7631 \cdot 10^4$   extrapolated and rounded (to a whole number) base count at Tbottom (entered into the part). |
| Equation 14P | $\text{fit}_{o,j} := \text{base}_j$   computed fit values. |
| Equation 14Q | $\text{fit}_{p,j} := \text{fit}_{p-1,j} + \text{slope}_{p-1,j}$ |
| Equation 14R | $\text{fitint}_{o,j} := \text{floor}(\text{fit}_{o,j})$ |
| Equation 14S | $\text{fitint}_{p,j} := \text{fitint}_{p-1,j} + \text{floor}(\text{slope}_{p-1,j} + .5)$   truncation of the fit values to integers (note that the slope value is rounded, not truncated). |
| Equation 14T | $yc\_act_{i,j} := (c^{(j)})_0 + \left(1 + \dfrac{\text{perr}_{hiTC}}{100}\right) + (c^{(j)})_1\left(1 + \dfrac{\text{tc1err}_{niTC}}{100}\right)1 + (c^{(j)})_2\left(1 + \dfrac{\text{tc2err}_{hiTC}}{100}\right)$ |
| | computation of second order graph (actual with drift). |
| | Now is a good opportunity to check the quantization error. |
| Equation 14U | $\text{slope\_adjust\_error} := \dfrac{.5}{2^{bin}}$   maximum error of the slope_adjust variable |
| Equation 14V | $\text{error\_runout} := \dfrac{\_\_(\_\_\_1)}{2} \text{slope\_adjust\_error}$ |
| Equation 14W | $\text{slope\_}_? = 72.73242$ |
| Equation 14X | $\dfrac{\text{error\_runnoff}_____?}{(2 \text{ slopes}\_\_?gn)} = 0.21812$   maximum error in deg C. due to quantization error(plus or minus this amount. This addition error may be seen usually in the\_\_\_\_\_. |
| | The error at each point is now computed and normalized to the count for 1 deg. C. at the actual temperature. |
| Equation 14Y | $\text{relerror\_curve}_{i,j} := -\left(\dfrac{yc_{i,j} - \text{count}_{i,j}}{\text{slope}_{i,j}gn}\right)$ |
| Equation 14Z | $\text{relerror\_curve\_fit}_{i,j} := -\left(\dfrac{\text{fitint}_{i,j} - \text{count}_{i,j}}{\text{slope}_{i,j}gn}\right)$ |
| Equation 14AA | $\text{relerror\_curve\_act}_{i,j} := -\left(\dfrac{yc\_act_{i,j} - \text{count}_{i,j}}{\text{slope}_{i,j}gn}\right)$ |
| Equation 14BB | $\text{ceil}\left[\dfrac{\ln[\text{count}_{(T_{top}-T_{bottom})}gn\;k]]}{\ln(2)}\right] = 16$ |
| Equation 14CC | $\text{conversion\_time}_j := \text{fitint}_{(T_{top}-T_{bottom})gn, j^{tloTC}}(T_{top} - T_{bottom})gn, j$ |
| Equation 14DD | $\text{conversion\_time}_k = 0.10563 \text{ sec}$   maximum conversion time for the above system. |

It can be seen from the error plot above that the second order fit is not very effective as the temperature measured becomes farther away from the temperatures at which the trim counts were taken during test. This is primarily due to having a temperature variable value in the denominator of the count equation, making a second order fit of the overall function limited in its accuracy. An alternative implementation is an iterative approach that adjusts the lo TC oscillator period to be constant and independent of temperature. This is done by introducing an adjustment factor in the form of blocking a percentage of the lo TC oscillator pulses based on temperature. Iteration is required because before the temperature reading is made, it is not known what adjustment must be made to the lo TC oscillator. Before the first reading is made, an arbitrary guess is made as to the current temperature, in the following example the midpoint of possible measured temperatures is chosen. A temperature reading is then made. The result of this reading then becomes the input to the lo TC oscillator adjustment network, and a second reading is made. This process is repeated until enough iterations are made such that two consecutive readings are the same. The process has proven to invariably converge, requiring four or five iterations to reach a stable result (see the following analysis).

A key to effectiveness of this iterative method is that the variability of the denominator of the count equation is eliminated, and the remaining count equation is more accurately fit by a second order curve. This results in less error runout as temperatures depart from the measured trim temperatures. In effect, it is easier to fit two second order curves separately (numerator and denominator) than one higher order curve (overall function). In fact, since the second order tempco of the poly used in the lo TC oscillator is quite small (<0.5 ppm/deg. C.) it may be possible to use a linear fit for this oscillator and maintain adequate accuracy.

Figure 14:
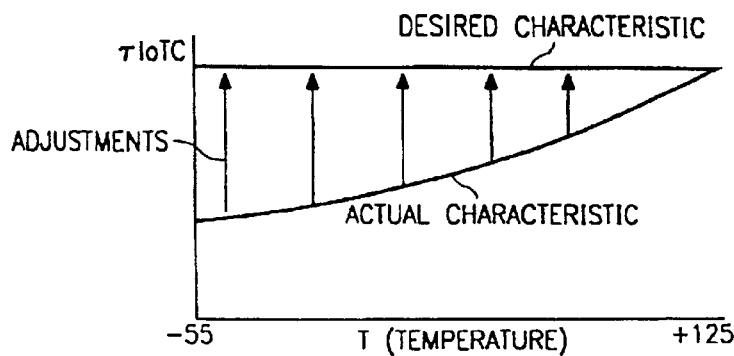
FIG. 14 is a graph showing the adjustments for ((Low ("lo") Temperature Coefficient ("TC") Oscillator ("OSC")) lo TC Oscillator Adjustment vs. temperature.

A method of blocking lo TC clock pulses is proposed. Since blocking pulses can only raise the apparent period of the clock (number of pulses in a given time is reduced), the target period of the oscillator is chosen to be the largest period under no adjustment. This occurs at the maximum temperature to be measured. At lower temperatures, the effective oscillator period is adjusted upward to match the period at the maximum temperature. FIG. 14 is a graph showing the adjustments for lo TC Oscillator Adjustment vs. temperature.

The following section provides the curve fits for the periods of the two oscillators when considering the iterative scheme. First, EQUATIONS 15A–15I correspond to the hi TC oscillator:

Equation 15A
$$E := \begin{bmatrix} 1 & i_{top} & i_{top}^2 \\ 1 & i_{middle} & i_{middle}^2 \\ 1 & i_{bottom} & i_{bottom}^2 \end{bmatrix}$$
when testing the part, a highly precise timing window is input into the part by the tester, enabling the main counter to count. This counter is clocked by the oscillator to be measured, in this case the hi TC oscillator. The period of the oscillator can be computed by examining the count reached during the enable window.

Equation 15B $ztop_j := \tau hiTC_{i_{top}j} - \Delta T_{error}(\tau hiTC_{j_{top}+gn,j} - \tau hiTC_{i_{top}j})$
Equation 15C $zmiddle_j := thiTC_{i_{middle}j} + DT_{error}(thiTC_{i_{middle}+gn,j} - thiTC_{i_{middle}j})$
Equation 15D $zbottom_j := \tau hiTC_{i_{bottom}j} + \Delta T_{error}(\tau hiTC_{i_{bottom}+gn,j} - \tau hiTCV_{i_{bottom}j})$
Equation 15E
$$z^{(j)} := \begin{bmatrix} ztop_j \\ zmiddle_j \\ zbottom_j \end{bmatrix}$$

Equation 15F
$$z^{(k)} = \begin{pmatrix} 12.01528 \\ 8.30795 \\ 5.67654 \end{pmatrix} \mu sec$$
period at each temperature.

Equation 15G
$$hiTC\_coef^{(j)} := (E^T E)E^T z^{(j)} \quad hiTC\_coef^{(k)} = \begin{bmatrix} 5.27937 \\ 0.01252 \\ 2.309092 - 10^{5(?)} \end{bmatrix} \mu sec$$
coefficients of the second order fit.

Equation 15H $thiTC\_tit_{kj} = (hiTC\_coef^{<j>})_0 + [hiTC\_coef^{<j>}]_1 \cdot i + (hiTC\_coef^{<j>})_2 i^2$ computation of second order graph lifted Equation 15I $\tau hiTC\_fit\_act_{i,j} := (hiTC\_coef^{(j)})_0 \left(1 + \frac{tc1err_{hiTCC}}{100}\right) i \ldots + (hiTC\_coef^{(j)})_2 \left(1 + \frac{tc2err_{hiTC}}{100}\right) i^2$ computation of second order graph (fitted with drift)

Figure 15:
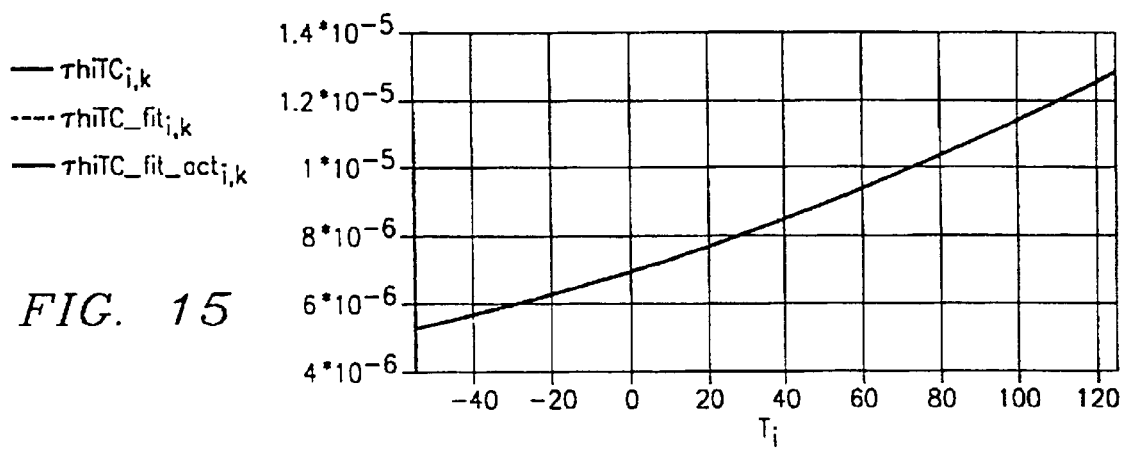
FIG. 15 is a graph showing the actual and fit values for the period for hi TC oscillator 320.

FIG. 15 is a graph showing the actual and fit values for the hi TC oscillator period.
EQUATIONS 16A"16H correspond to lo TC oscillator:

Equation 16A
$$F := \begin{bmatrix} 1 & i_{top} & i_{top}^2 \\ 1 & i_{middle} & i_{middle}^2 \\ 1 & i_{bottom} & i_{bottom}^2 \end{bmatrix}$$

Equation 16B $xtop_j := tloTC_{i_{top}j} - \Delta T_{error}(tloTC_{i_{top}+gn,j} - tloTC_{i_{top}j})$ these readings also include the Teague Effect.

-continued

Equation 16C  $\text{xmiddle}_j := \text{tloTC}_{i_{\text{middle}}j} - \Delta T_{\text{error}}(\text{tloTC}_{i_{\text{middle}}+gn,j} - \text{tloTC}_{i_{\text{middle}}j})$ Equation 16D  $\text{xbottom}_j := \text{tloTC}_{i_{\text{bottom}}j} := -\Delta T_{\text{error}}(\text{tloTC}_{i_{\text{bottom}}+gn,j} - \text{tloTC}_{i_{\text{bottom}}j})$ Equation 16E $$xx^{\langle j \rangle} := \begin{bmatrix} \text{xtop}_j \\ \text{xmiddle}_j \\ \text{xbottom}_j \end{bmatrix} \quad xx^{\langle k \rangle} := \begin{pmatrix} 2.79465 \\ 2.63043 \\ 2.4762 \end{pmatrix} \mu\text{sec}$$

period at each temperature

Equation 16F $$\text{loTC\_coef}^{\langle j \rangle} (F^T F)^j F^T xx^{\langle j \rangle} = \begin{bmatrix} 2.44656 \\ 9.81509 - 10\text{--}^? \\ 2.22146 - 10\text{--}^? \end{bmatrix} \mu\text{sec}$$

coefficients of the second order fit.

Equation 16G  $\text{tloTC\_fit}_{i,j} := (\text{loTC\_coef}^{\langle j \rangle})_0 + (\text{loTC\_coef}^{\langle j \rangle})_1 i + (\text{loTC\_coef}^{\langle j \rangle})_2 i^2$ Equation 16H  $\text{tloTC\_fit\_act}_{i,j} := (\text{loTC\_coef}^{\langle j \rangle})_0 \left(1 + \frac{\text{perr}_{\text{loTC}}}{100}\right) + (\text{loTC\_coef}^{\langle j \rangle})_1 (1 + \underline{\text{tc1err}_{\text{loTC}}}100)i \ldots + (\text{loTC\_Coef}^{\langle j \rangle})_2 \left(1 + \frac{\text{tc2err}_{\text{loTC}}}{100}\right)i^2$ computation of second order graph (fitted with drift included).

The lo TC oscillator may need to be fitted with a second order or linear fit. This section fits a line to the computed second order fit. It is possible to use second order data because readings at three temperatures are necessary to acquire a second order fit for the hi TC oscillator. However, much die area would be saved by using a linear fit, as shown in EQUATIONS 17A–17J.

Figure 16:
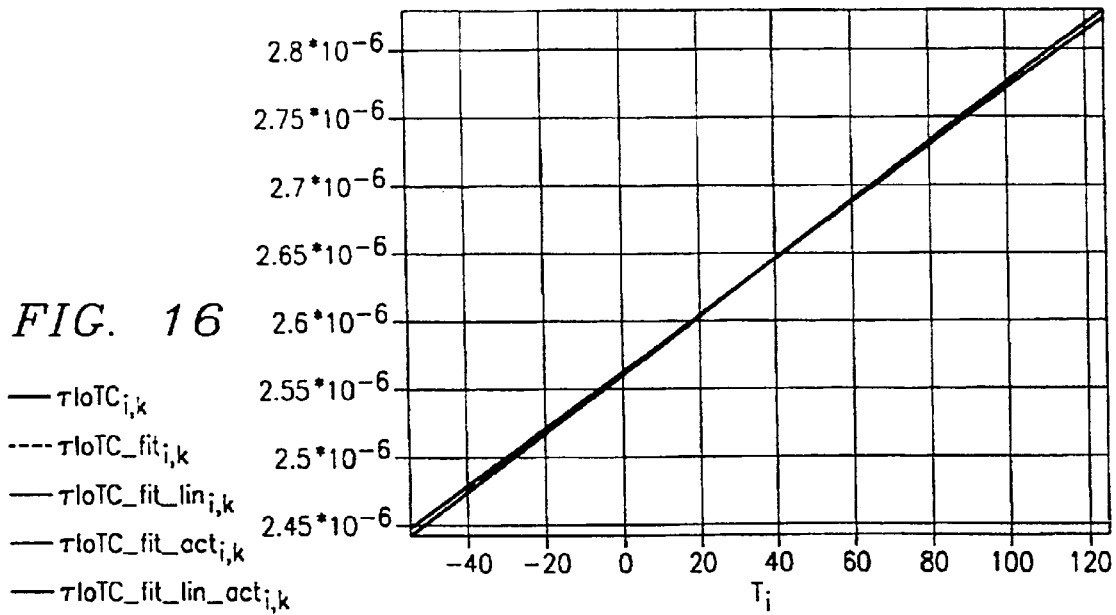
FIG. 16 is a graph showing the actual data (solid line), second order fit (dotted line), and linear fit (dashed line) of the lo TC Oscillator 310.

FIG. 16 is a graph showing the actual data (solid line), second order fit (dotted line), and linear fit (dashed line) for the lo TC oscillator.

The following assumes a count output that is proportional to the hi TC curve fit. This assumes a constant lo TC oscillator period of the value at the highest possible measured temperature, as shown in EQUATION 18A.

Since this is the curve to be used by the part to determine the temperature, it must be fit and parameters must be entered into the part. Again, the most economical design would be a linear fit of the lo TC oscillator. In the following analysis, this design is assumed and denoted by _lin in the names of the lo TC oscillator variables, as shown in EQUATIONS 19A–19I:

Equation 16H  $\text{count\_iter}_{i,j} := \dfrac{\tau\text{hiTC}_{i,j} 2^n}{\tau\text{loTC\_fit}_{\text{numpts } j}}$   fit curve for the count of the iternative method system.

Equation 19A $$H := \begin{bmatrix} 1 & 1_{\text{top}} & 1^2_{\text{top}} \\ 1 & 1_{\text{middle}} & 1^2_{\text{middle}} \\ 1 & 1_{\text{bottom}} & 1^2_{\text{bottom}} \end{bmatrix} \ldots \text{ solution matrix } H := \begin{bmatrix} 1 & i_{\text{top}} & i^2_{\text{top}} \\ 1 & i_{\text{middle}} & i^2_{\text{middle}} \\ 1 & i_{\text{bottom}} & i^2_{\text{bottom}} \end{bmatrix}$$

Equation 19B  $\text{Ytop}_j := \text{ztop}_j \dfrac{2^n}{\tau\text{loTC\_fit\_bin}_{\text{numpts}}}$ Equation 19C  $\text{Ymiddle}_j := \text{zmiddle}_l \dfrac{2^n}{\tau\text{loTC\_fit\_bin}_{\text{numpts1}}}$   the fitted count is: hi TC period times $2^n$ n divided by lo TC period at the highest temperature.

Equation 19D  $\text{Ybottom}_j := \text{zbottom}_l \dfrac{2^n}{\tau\text{loTC\_fit\_bin}_{\text{numpts1}}}$ -continued

| | | | |
|---|---|---|---|
| Equation 19E | $y^{(j)} := \begin{bmatrix} Ytop_l \\ Ymiddle_l \\ Ybottom_l \end{bmatrix}$ | | |
| Equation 19F | $y^{(k)} := \begin{bmatrix} 3.48535 - 10^4 \\ 2.40994 - 10^4 \\ 1.64663 - 10^4 \end{bmatrix}$ | actual measured counts. | |
| Equation 19G | $c^{<j>} := (H^T H)^{-1} H^T Y^{<j>}$ | | |
| Equation 19H | $c^{(k)} := \begin{bmatrix} 1.53142 - 10^4 \\ 36.32282 \\ 0.06936 \end{bmatrix}$ | coefficients of the second order fit. | |

Now a similar method is used to compute the base, slope and slope_adjust values as for the fit of the overall count, as computed in EQUATIONS 20A–20L:

| | | |
|---|---|---|
| Equation 20A | $Slope\_adjust_j := \dfrac{floor[[2(C^{(j)})_2 2^{bin}]] + .5}{2^{bin}}$ | entered slop variable. |
| Equation 20B | $Slope\_adjust_k = 0.13867$ | |
| Equation 20C | $Slope_{o,j} := \dfrac{floor[[(C^{(j)})_1 + 2(C^{(j)})_2 i_{ave}]2^{bin} + .5]}{2^{bin}} - Slope\_adjust_j i_{ave}$ | |
| Equation 20D | $Slope_{o,k} := 36.33008$ | extrapolated and rounded slope variable (entered into the part). |
| Equation 20E | $Slope_{p,j} := Slope_{p-j} + Slope\_adjust_l$ | slope at each temperature snap point. |
| Equation 20F | $Base_l := floor\left[\left(Yc1_{ave-1} - Slope_{0-j}^{-1ave}\right) - \dfrac{Slope\_adjust_j}{2}[i_{ave}(i_{ave-1})]\right]$ | |
| Equation 20G | $Base_k := 1.5325 - 10^4$ | extrapolated and rounded (to a whole number) base count at Tbottom (entered into the part). |
| Equation 20H | $Fit_{o,j} := Base_j - Slope_{o,j}\left(\dfrac{1}{2}\right) - \dfrac{Slope\_adjust_j}{2}\left(\dfrac{1}{2}\right)^2$ | this adjustment shifts the count boundaries by ½ lsb such that temperature values will by rounded instead of truncated. |
| Equation 20I | $Fit_{p,j} = Fit_{p-j} + Slope$ | |
| Equation 20J | $Fitint_{o,j} := floor(Fit_{o,j})$ | |
| Equation 20K | $Fit\_eqn_{i,j} := Fit_{o,j} + Slope_{o,j}i + \dfrac{Slope\_adjust_j}{2}i^2$ | truncation of the fit values to integers. Note that the slope value is increased by 5 - this is done to round the slope values instead of truncate it. The increased value is entered into the part. |
| Equation 20L | $MX^{<j>} := C^{<j>}$ | these are the coefficients of the second order equation used to fit the count function for the interative method. The quadratic formula will be used to calculate the temperature based on the actual count. |

Figure 17:
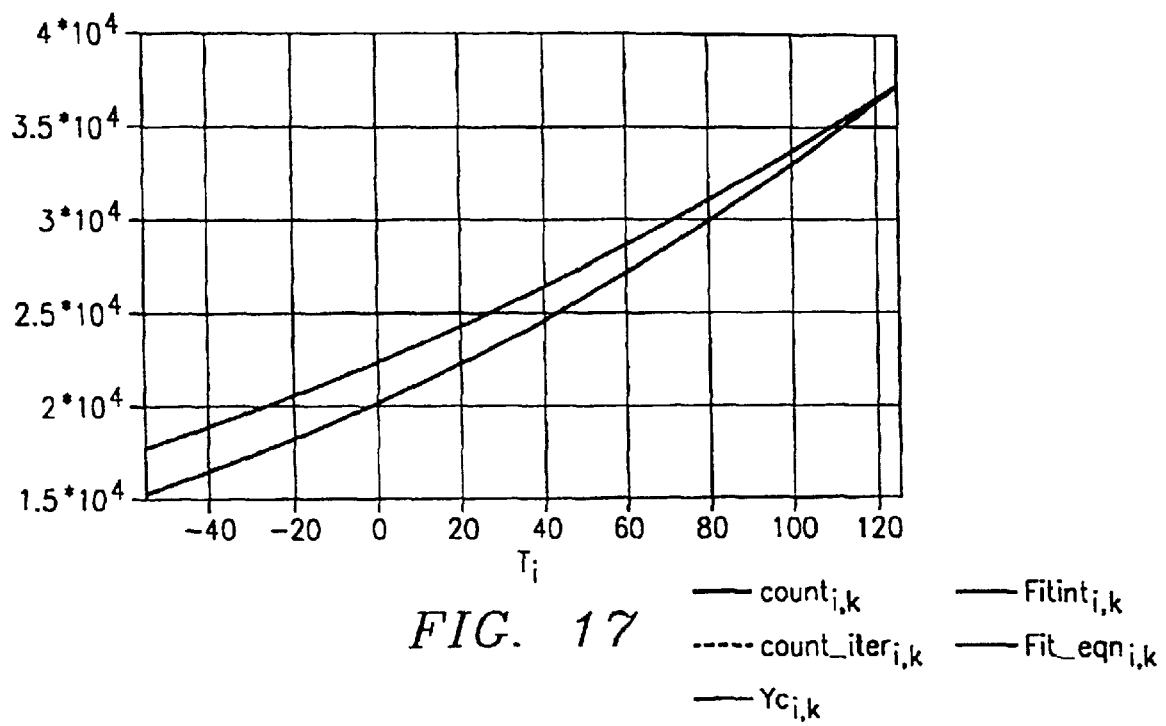
FIG. 17 is a graph of the actual count and count fit based on a constant period of lo TC oscillator 310.

FIG. 17 is a graph of the actual count and count fit based on a constant lo TC oscillator period. Referring to FIG. 17, it can be seen that the new fitted curve lies below the fit of the overall count function, and the two converge at the top temperature (125° C.). This makes sense, since the lo TC oscillator is effectively slower for the bottom curve because some of the pulses are blocked for temperatures below 125 deg. C.

The following is a set of iterations to reach a temperature output. The found temperature as well as the conversion time for each temperature at each iteration is found. See EQUATIONS 21A–21B.

| | | |
|---|---|---|
| Equation 21A | $Tout_{o,j} := T_{ave}$ | . . . starting point for temperature iteration. |
| Equation 21B | $ix := 0,1 \ldots numpts$ | . . . iteration variable for finding output temperature for next iteration. |

The design of the lo TC adjustment circuit was done to minimize chip area consumed. The method used was to block a number of pulses proportional to the difference between the perceived temperature (current value in the temperature register) and the top temperature where no pulses are blocked. More pulses are blocked at lower temperatures. The percentage of pulses blocked is given by EQUATION 22:

$$\frac{T_{top} - T_{current}}{frac}$$

Where frac is a constant of proportion used to fit the slope of the lo TC linear function, this value may be different for different process lots, so it must be trimmed in each part. The computation of frac is shown in the following EQUATIONS 22A–22B:

$$frac_k := floor\left[\frac{(T_{top} - T_{bottom})}{1 - \left(\frac{\tau loTC\_fit\_lin_{0,k}}{\tau loTC\_fit\_lin_{numpts,k}}\right)} + .5\right] \quad \text{Equation 22A}$$

$$frac_k = 1.33 \cdot 10^3 \quad \text{Equation 22B}$$

Figure 18:
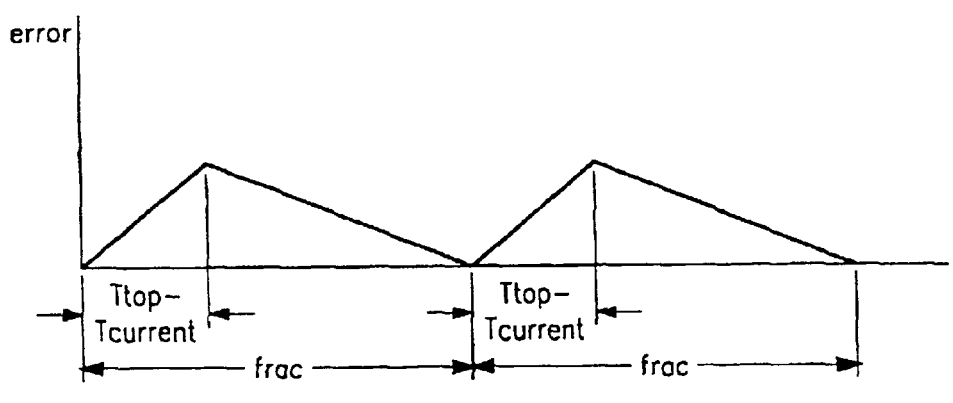
FIG. 18 is a graph showing the oscillator adjustment error.
Figure 18:
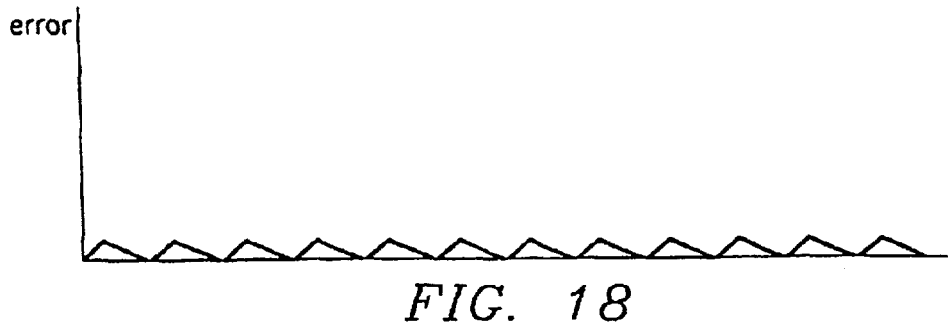

In this example, $T_{top}$-$T_{current}$ pulses are blocked for every 1333 lo TC oscillator pulses. Originally, it was proposed that all the pulses to be blocked would be done at the beginning of each frac count. However, this could lead to unacceptable error as shown in FIG. 18. As the pulses are blocked together, error accumulates, but then diminishes as the frac count completes. A better way to do this is to spread the pulse blocking evenly throughout each frac section. Since the maximum number of pulses blocked is $T_{top}$-$T_{bottom}$, it can be set up that this number of pulses may be blocked evenly by finding how often a pulse must be blocked (called interval).

This method is improved further by adjusting the interval upward at higher temperatures where less pulses are blocked, spreading them out more evenly. This is done in the actual design, but is not addressed here due to the complexity of mathematically representing it in the text. All the following computations are done using a constant interval value, and temperature errors reflect this method. See EQUATION 24A.

| Equation 24A | $count\_act_i := floor\left(\frac{\tau hiTC_{i,k} 2^n}{\tau loTC_{i,k}}\right)$ | actual count without any lo TC oscillator adjustment. The adjustment factors will be added to give the actual count. |
|---|---|---|

The iterations are now done, the temperature measured is recorded at the end of each iteration as well as the amount of error relative to the actual temperature. These computations represent the best method of emulating what actually happens in the part. EQUATIONS 25A–25O correspond to the first iteration. EQUATIONS 26A–26O correspond to the second iteration. EQUATIONS 27A–27O correspond to the third iteration. EQUATIONS 28A–28O correspond to the fourth iteration. EQUATIONS 29A–29O correspond to the fifth iteration. FIGS. 19A–19C are graphs of temperature sensor error vs. iteration compared to second order fit of count approach. Note that while five iterations are shown in the preferred embodiment, more or less iterations are well within the scope of the invention. The number of iterations may change pursuant to the operating conditions, application requirements, etc.

Preferred embodiments of temperature detector 200 shown in FIGS. 1A, 1B, and 1C provide 9 bit temperate readings which indicate the temperature of the device. This temperature is expressed in 0.5° C. increments, providing 0.5° C. resolution. Note the resolution may change (or be changed—depending upon the tradeoffs discussed above) in preferred embodiments for different ranges of temperature.

In particular, in the 0° C. to +70° C. range, preferred embodiments are generally accurate to 0.5° C. as well. Whereas in the −40° C. to 0° C. range, as well as from +70° C. to +85° C., the accuracy of preferred embodiments is within 1° C. Extending the temperature range even further, from −55° C. to 40° C. and from +85° C. to +125° C., the integrated circuit is accurate to within 2° C.

While these accuracies are very good for many applications, there are situations where the 0.5° C. resolution is not adequate. In proportional control systems where the absolute temperature is not as critical as the trend in temperature, greater resolution may be required.

Figure 20:
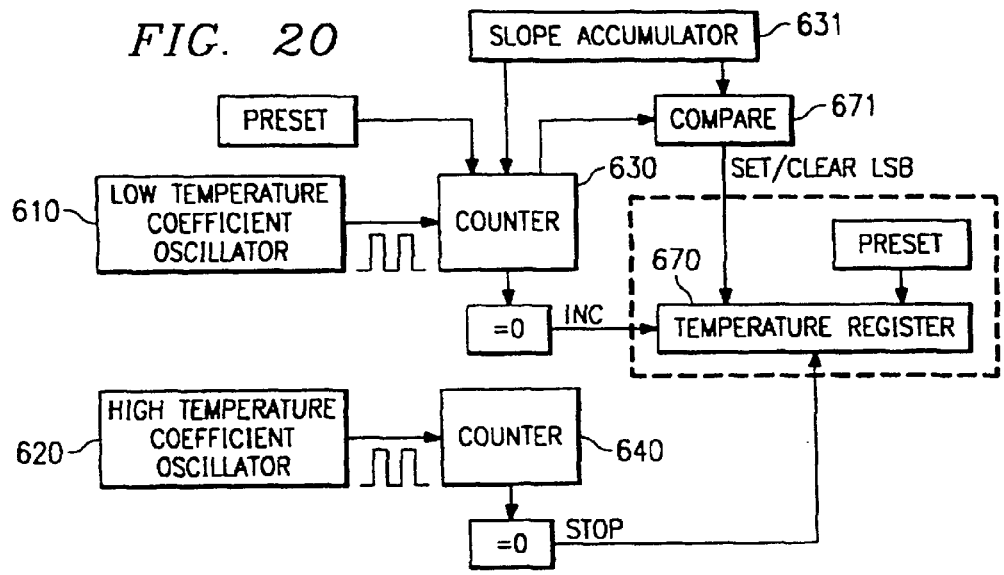
FIG. 20 is a functional/structural block diagram of a preferred embodiment temperature detector 200 that provides higher resolution.
Figure 21:
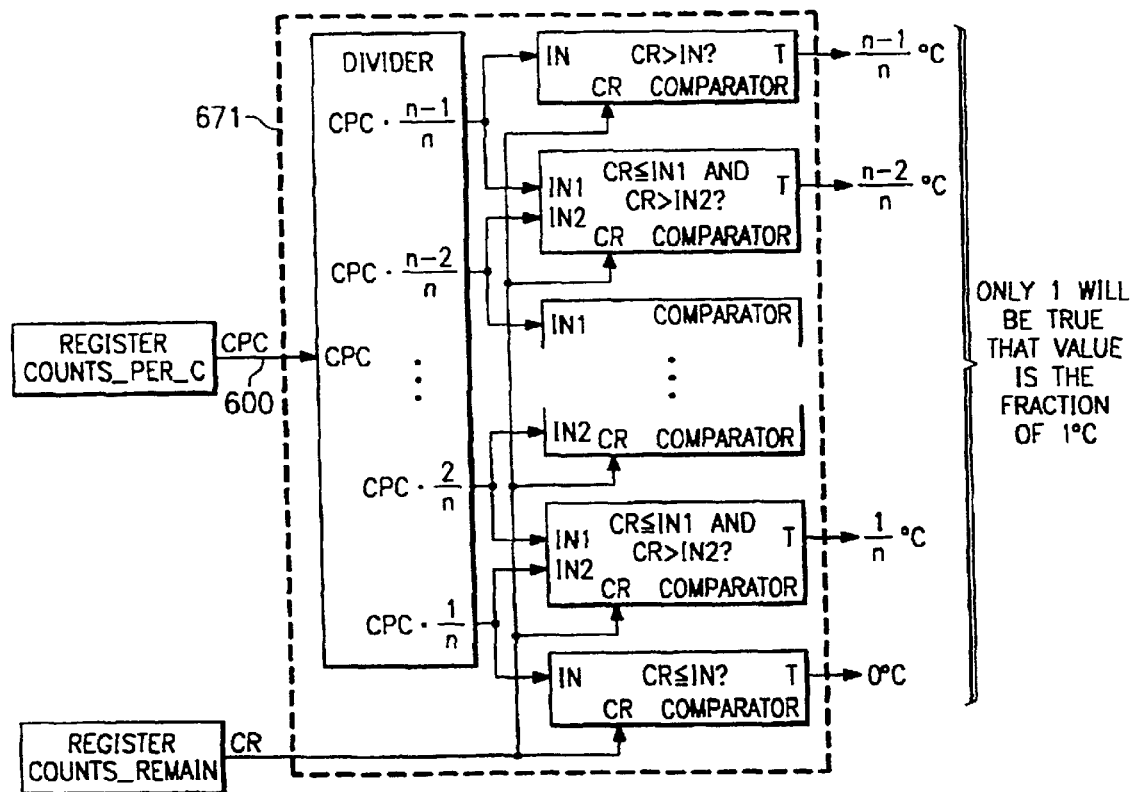
FIG. 21 is a more detailed circuit implementation of the functional/structural block diagram of slope accumulator 631, which comprises tempco register 660 (e.g., or intercept and slope register 660) and accumulator 662 in FIG. 2D, and compare block 671 in FIG. 20, which is used to provide higher resolution.
Figure 22:
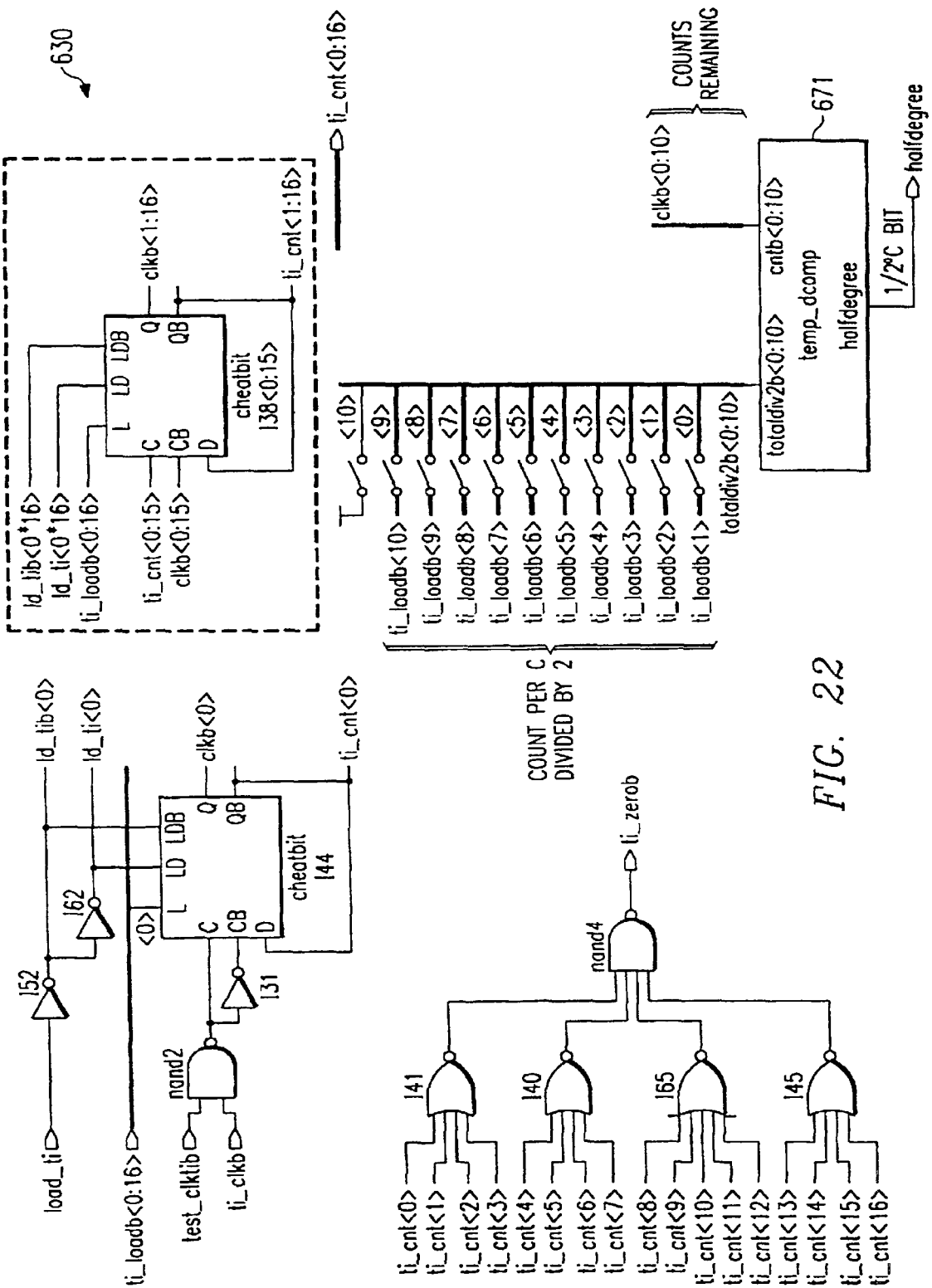
FIG. 22 is a preferred circuit diagram of compare block 671.
Figure 23:
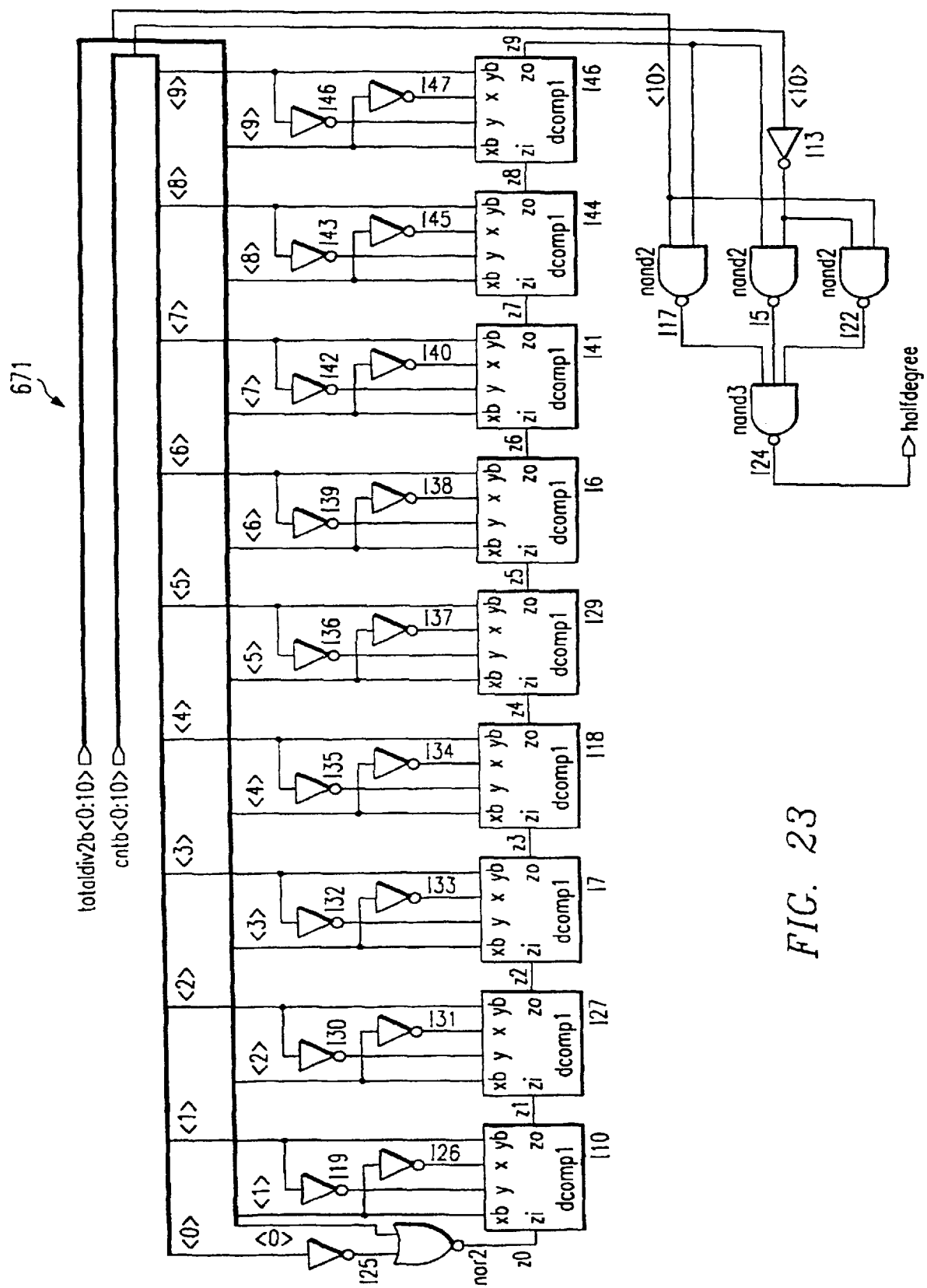
FIG. 23 is a preferred circuit diagram of temp_dcomp block 679 of FIG. 22, showing preferred circuitry.

FIG. 20 is a functional/structural block diagram of a preferred embodiment temperature detector 200 that provides higher resolution. FIG. 21 is a more detailed circuit implementation of the functional/structural block diagram of slope accumulator 631, which comprises tempco register 660 and accumulator 662 in FIG. 2D, and compare block 671 in FIG. 20, which is used to provide higher resolution. FIG. 22 is a preferred circuit diagram of compare block 671. FIG. 23 is a preferred circuit diagram of temp_dcomp block 679 of FIG. 22, showing preferred circuitry;

Referring to FIGS. 20–23, additional test modes for temperature detector 200 allow the user to provide 0.1° C. resolution with temperature detector 200 and some overhead software, shown in Appendix B. While this does not increase the accuracy of the device, it may provide better control of some systems by having finer resolution of temperature.

Regarding the operating measurement temperature, temperature detector 200 measures temperatures through the use of an on-board temperature measurement techniques and procedures discussed above. As mentioned above, block diagram of the temperature measurement circuitry is shown in FIG. 20.

Preferred system embodiments measure temperature by counting the number of clock cycles that an oscillator with a low temperature coefficient goes through during a gate period determined by a high temperature coefficient oscillator. The counter is preset with a base count that corresponds to −55° C. If the counter reaches zero before the gate period is over, the temperature register, which is also preset to the −55° C. value, is incremented, indicating that the temperature is higher than −55° C.

At the same time, compare block 671 is then preset with a value determined by the slope accumulator circuitry. This circuitry is needed to compensate for the parabolic behavior of the oscillators over temperature. The counter is then clocked again until it reaches zero. If the gate period is still not finished, then this process repeats.

Slope accumulator 631 is used to compensate for the nonlinear behavior of the oscillator over temperature, yielding a high resolution temperature measurement. This is done by changing the number of counts necessary for the counter to go through for each incremental degree in temperature. Therefore, to obtain the desired resolution, both the value of the counter and the number of counts per degree C (the value of the slope accumulator) at a given temperature must be known.

Internally, this calculation is done inside preferred system embodiments to provide 0.5° C. resolution. Note that temperature is represented in the DS 1620 in terms of a ½° C. LSB, yielding the following 9-bit format:

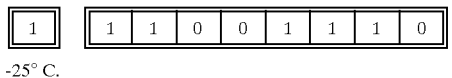

-25° C.

Higher resolutions may be obtained by reading the temperature, truncating the 0.5° C. bit (the LSB) from the read value, and then dividing by two. This value is TEMP_READ. The value left in the counter may then be read. This value is the count remaining (COUNT_REMAIN) after the gate period has ceased. By loading the value of the slope accumulator 631 into the count register, this value may then be read, yielding the number of counts per degree C. (COUNT_PER_C) at that temperature. The actual temperature may be then calculated by the user using the following:

As mentioned, preferred system embodiments also provide the capability of obtaining 0.1° C. resolution.

The following steps describe the process necessary to obtain 0.1° C. resolution from preferred system embodiments. First, if preferred system embodiments is not already in ONESHOT mode, do so by sending the WRITE CONFIG protocol with the appropriate write data. For more information on this protocol and the mode settings.

Protocol to set both ONESHOT and CPU modes:

| 0C | 03 | (hex) |

Protocol to set only ONESHOT mode:

| 0C | 01 | (hex) |

The final protocol listed above is usually the desired mode setting when using a computer to control preferred system embodiments.

Second, issue the START CONVERT command to the part (EE hex).

Third, issue the READ CONFIG command (AC hex) to read the configuration register data from preferred system embodiments. Repeat this command until the most significant bit (i.e., the DONE bit) of the register is a "1". This means that the temperature conversion has completed. The logical description for that condition using C language nomenclature is:

(config & 0x80)==0x80

Fourth, issue the READ TEMPERATURE command, as described in the data sheet, which is AA hex. Truncate the ½ degree bit from the read value, convert it to a signed integer, and then divide by two. That modified value is TEMP_READ.

Fifth, issue the READ COUNTER command, which is not documented in the data sheet. That protocol works the same way as those that read the thermostat settings. First, send the protocol, which is AC hex. Then read back a 9-bit value from the part. This value is COUNT_REMAIN.

Sixth, issue the LOAD SLOPE command, which also is not documented in the data sheet. The protocol is 41 hex, and requires no data to read or write. This command loads the slope value into the counter.

Seventh, issue the READ COUNTER command again, as described in step 5 above. The value read is COUNT_PER_C.

Eighth, calculate the actual temperature using the following formula, again using C nomenclature:

TEMPERATURE□TEMP_READ−0.25+(COUNT_PER_C−COUNT_REMAIN)/COUNT_PER_C

Ninth, repeat steps 2 through 8 as desired.

As mentioned above, the above steps can be implemented in programming language "C", as shown in Appendix B.

Figure 24:
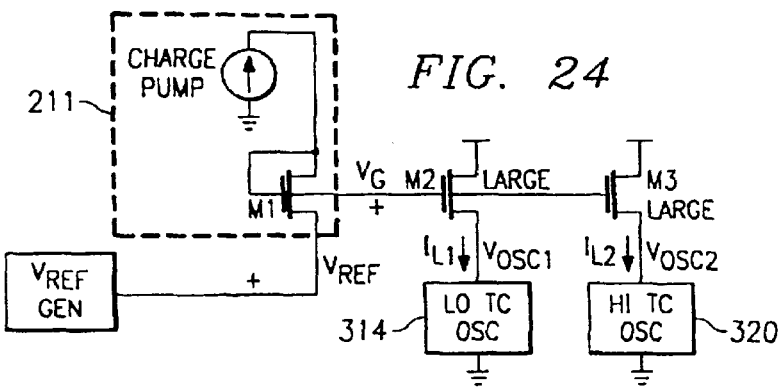
FIG. 24 is a preferred circuit diagram of power supply regulator 211 along with temperature-dependent oscillator 320 and temperature-independent oscillator 310 shown in FIGS. 1B and 2C.
Figure 26:
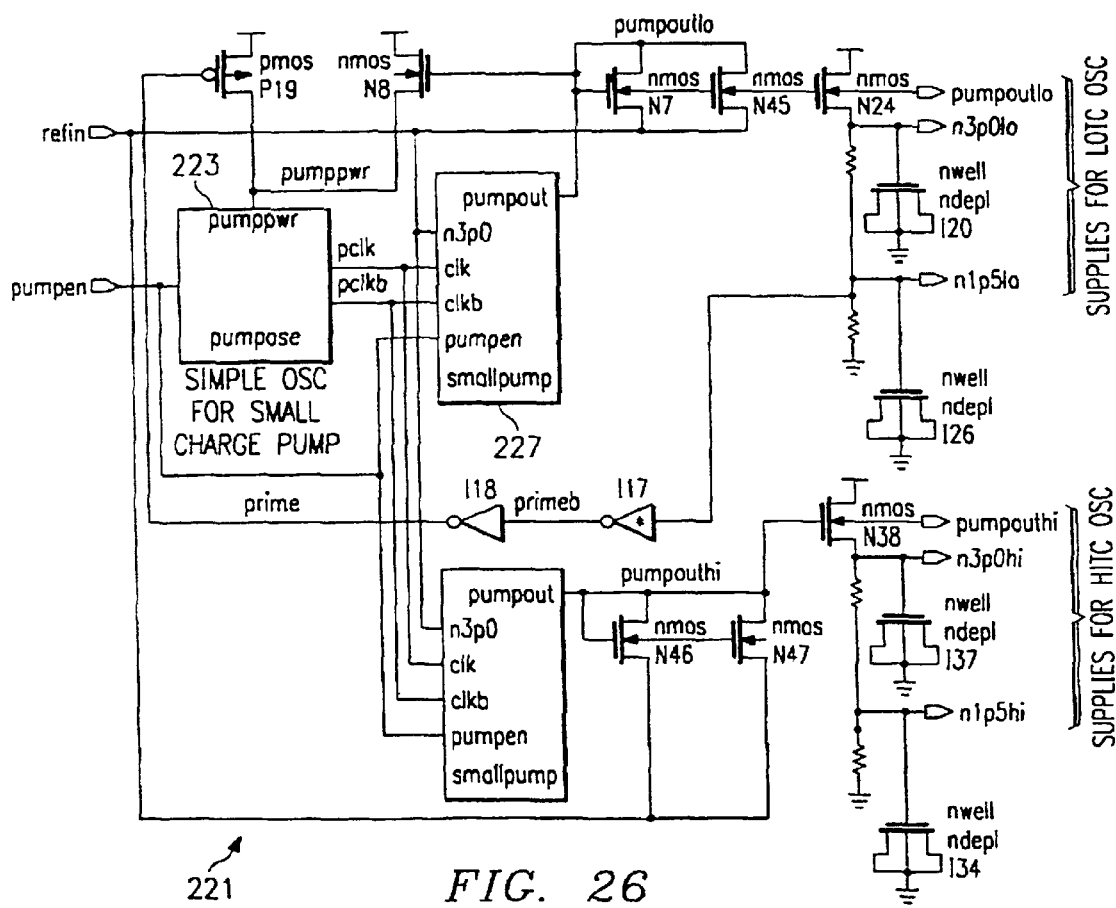
FIG. 26 is the schematic of preferred circuitry for "regpump" block 221 of FIG. 25, which is used to regulate the charge pump.
Figure 25:
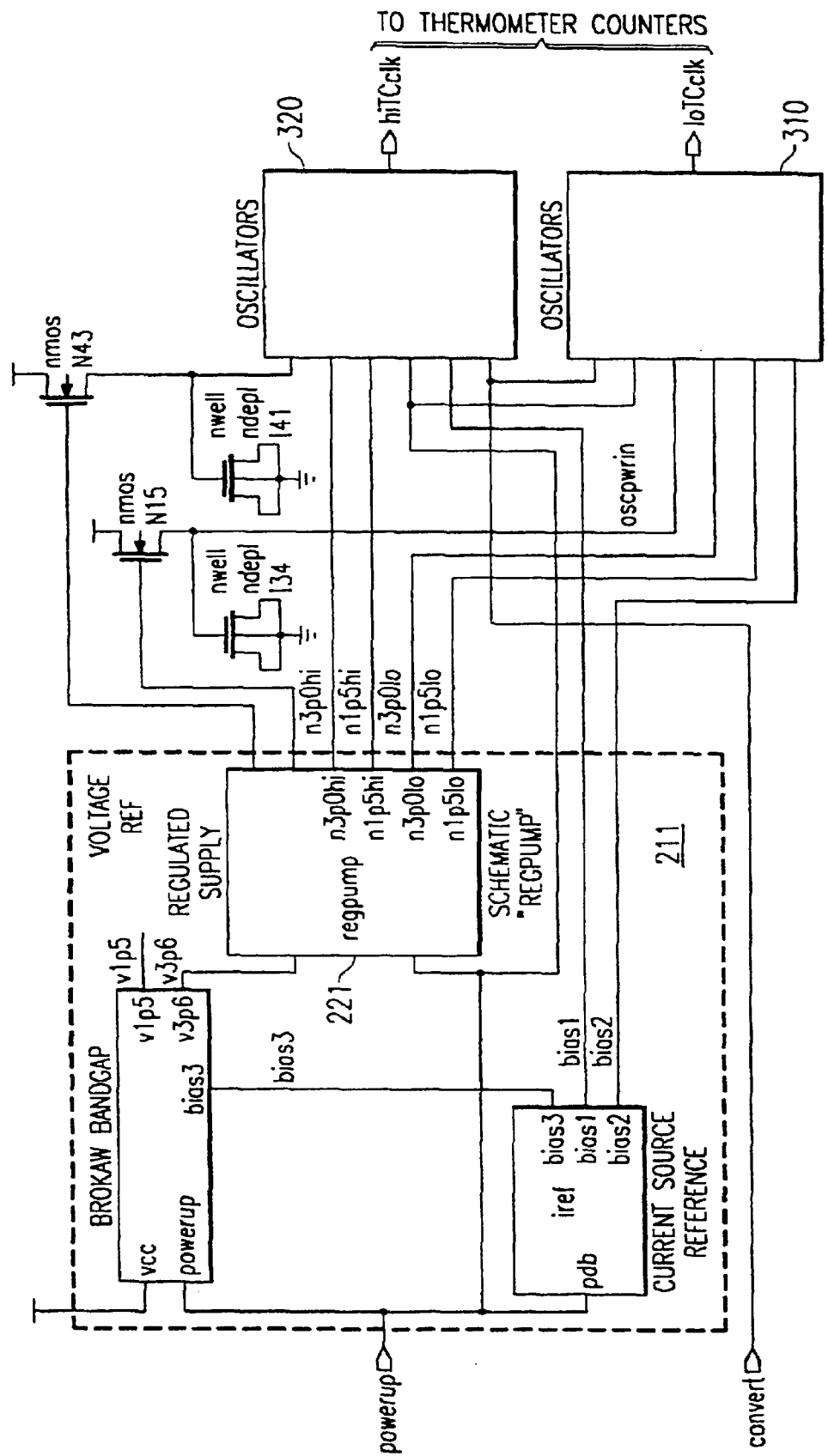
FIG. 25 is a the preferred circuitry of power supply regulator 211 along with temperature-dependent oscillator 320 ((High ("hi") Temperature Coefficient ("TC") Oscillator ("OSC") 320 in FIG. 2A) and temperature-independent oscillator 310 ((Low ("lo") Temperature Coefficient ("TC") Oscillator ("OSC")) shown in FIGS. 1B, 2C, and 24.
Figure 27:
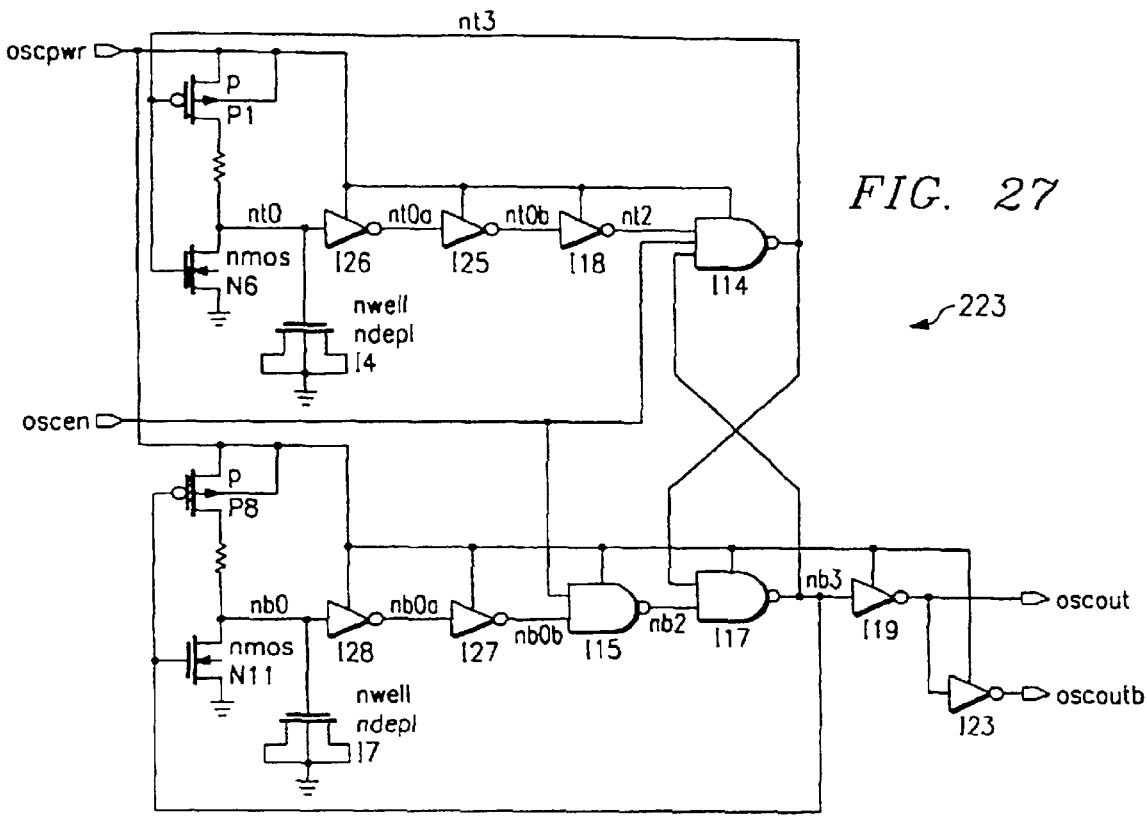
FIG. 27 is the schematic of preferred circuitry for "pumposc" block 223 of FIG. 26, which is used to regulate the charge pump.
Figure 28:
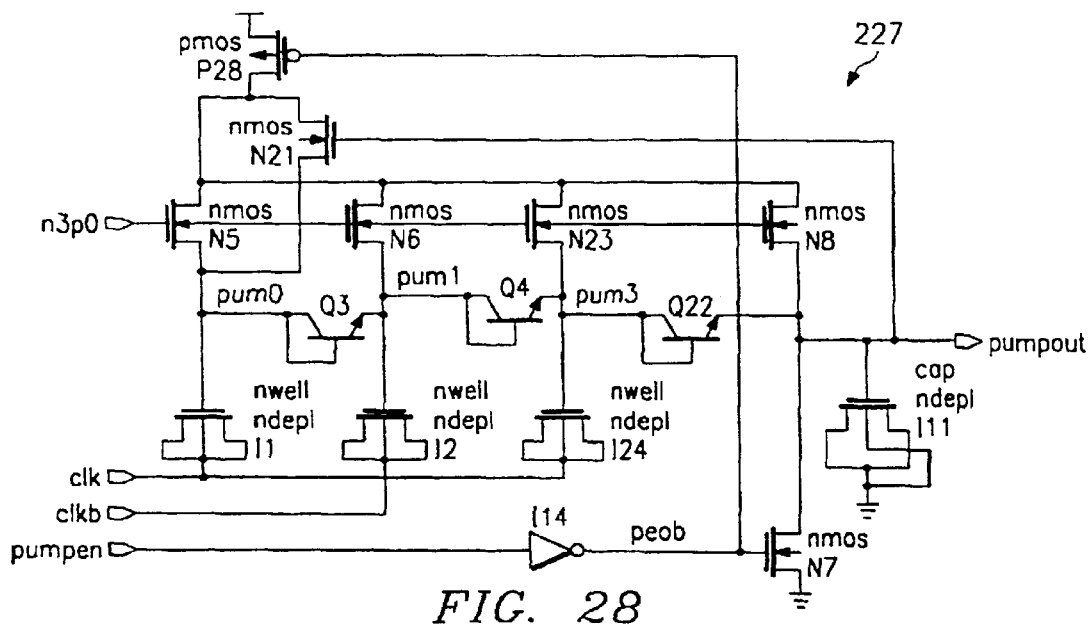
FIG. 28 is the schematic of preferred circuitry for "smallpump" block 227 of FIG. 26, which is used to regulate the charge pump.

Referring again to power supply regulator 211 shown in FIGS. 1B and 2C and described briefly above, FIG. 24 is a preferred circuit diagram of power supply regulator 211 along with temperature-dependent oscillator 320 (High ("hi") Temperature Coefficient ("TC") Oscillator ("OSC")) and temperature-independent oscillator 310 (Low ("lo") Temperature Coefficient ("TC") Oscillator ("OSC")) shown in FIGS. 1B and 2C. FIG. 25 is the preferred circuitry of power supply regulator 211 along with temperature-dependent oscillator 320 (High ("hi") Temperature Coefficient ("TC") Oscillator ("OSC")) and temperature-independent oscillator 310 (Low ("lo") Temperature Coefficient ("TC") Oscillator ("OSC")) shown in FIGS. 1B, 2C, and 24. FIG. 26 is the schematic of preferred circuitry for "regpump" block 221 of FIG. 25, which is used to regulate the charge pump. FIG. 27 is the schematic of preferred circuitry for "pumposc" block 223 of FIG. 26, which is used to regulate the charge pump. FIG. 28 is the schematic of preferred circuitry for "smallpump" block 227 of FIG. 26, which is used to regulate the charge pump. As was described above, improved power supply regulator 211 is combined with the functional/structural block circuit diagram of the preferred embodiment of temperature detector 200 shown in FIG. 1A. The use of power supply regulator 211 is preferred, because time-to-output converters 210 and temperature-to-time converter 220 were found to have a significant dependence upon $V_{DD}$—thereby providing two different readings at a constant temperature. Power supply regulator 211 regulates the power supplied to time-to-output converter 210 and temperature-to-time converter 220. Power supply regulator 211, because it is unconditionally stable, tolerates to widely varying $V_{CC}$ and loads, and capable of supplying a regulated voltage within 0.6V of the power supply.

Referring to FIG. 24 for an overall understanding of the overall system, the general operation is as follows: The $V_{REF}$ generator gives a VCC and temperature insensitive voltage output $V_{REF}$ (e.g., 3.0V in preferred system embodiments). A weak charge pump capable of generating a voltage higher than VCC pumps until it is clamped at $V_G = V_{REF} + V_{TN}$ by MOS diode M1. $V_G$ then gates M2 and M3, which are large power supply transistors. M2 and M3 are large in order that changes in load currents $I_{L1}$ and $I_{L2}$ and in VCC have little effect on oscillator supply voltages shown in the following EQUATION 30:

$$V_{OSC1} = V_{OSC2} = V_G - V_{TN} - \frac{\sqrt{IL^*}}{K'W/L}$$

Equation 30

$$\approx V_{OSC1} + V_{OSC2} \over V_{REF}$$

$* \frac{\sqrt{IL}}{K'W/L}$ issmall.

Figure 2D:
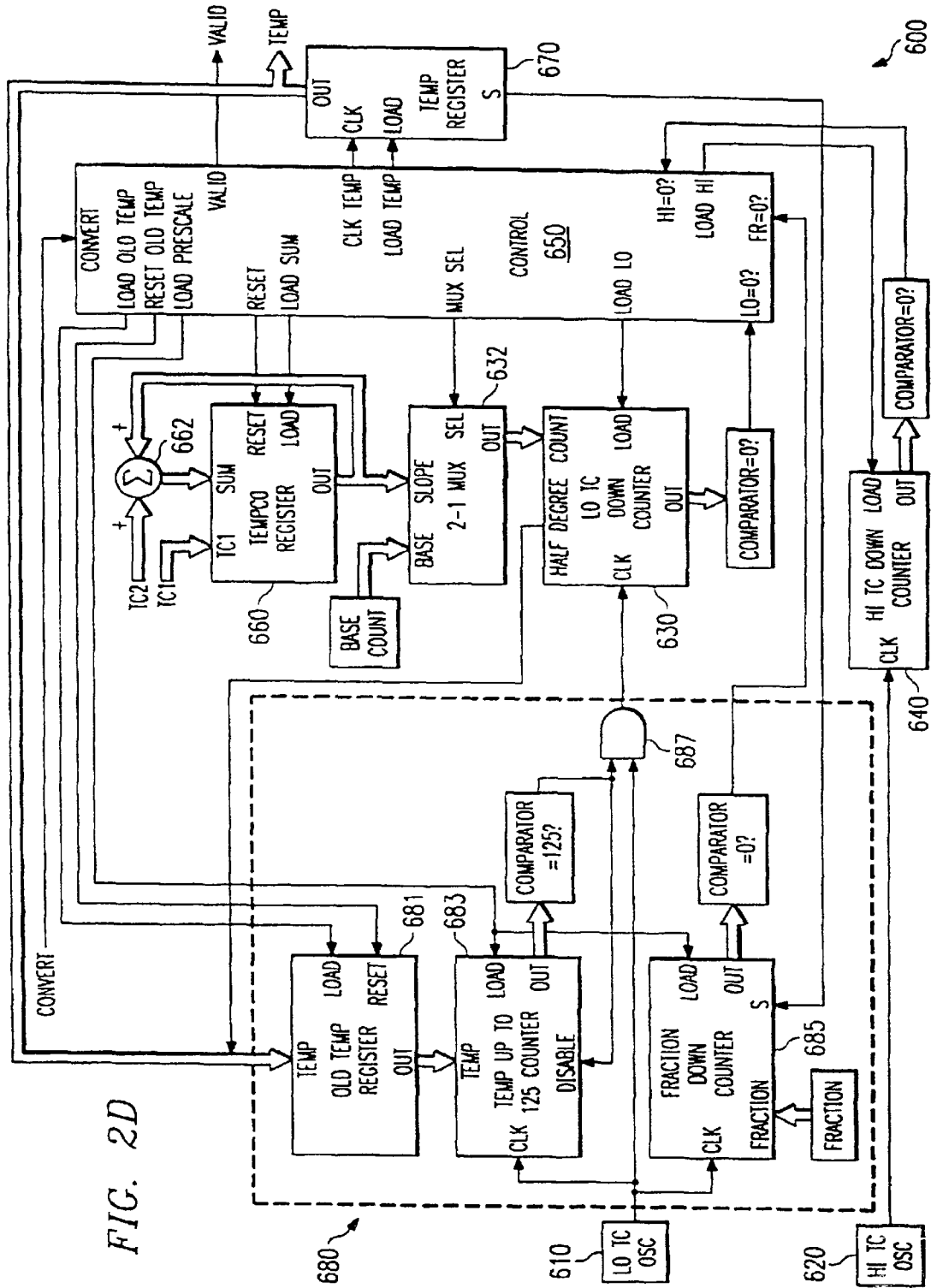
FIG. 2D is a more detailed preferred block diagram of preferred embodiment of temperature detector 200 in FIG. 1A that is generally denoted by reference numeral 600.
Figure 2E:
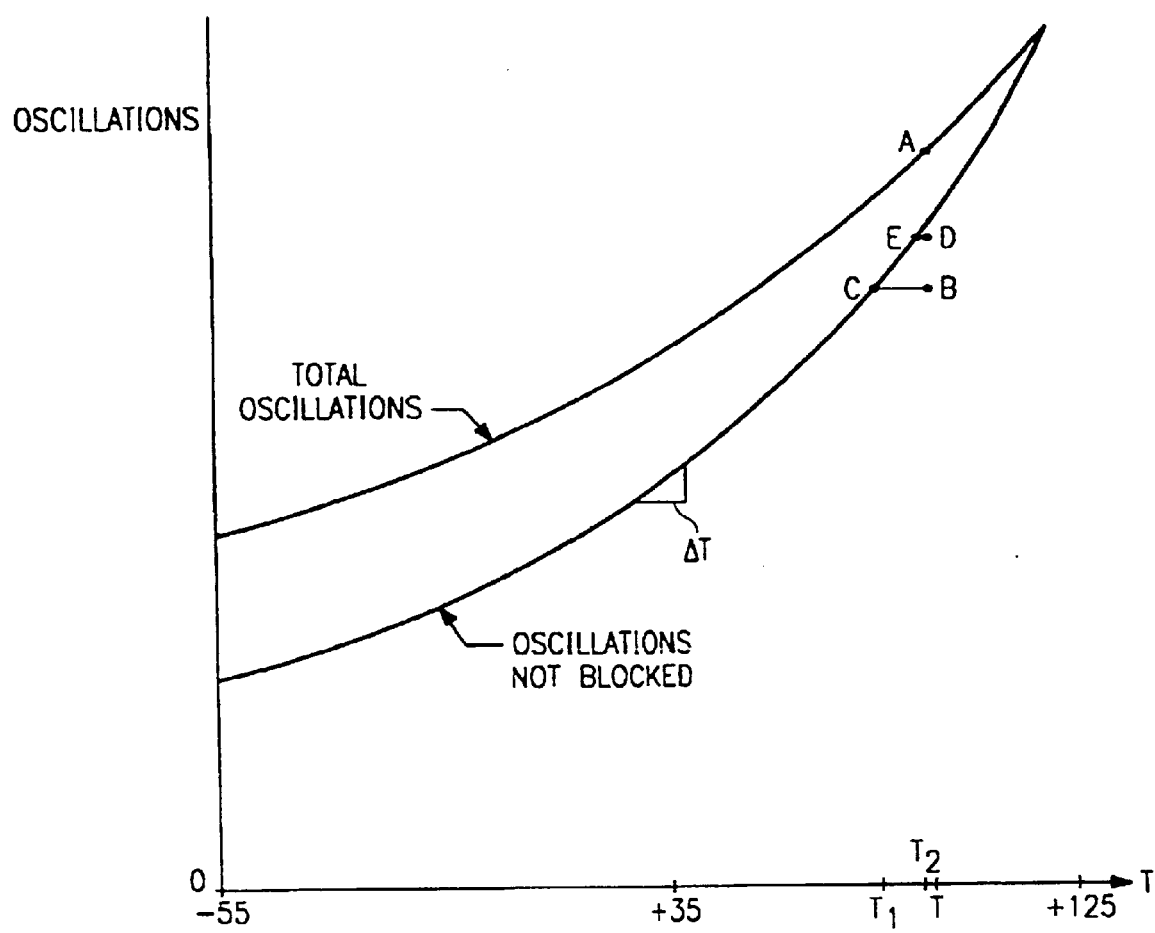
FIGS. 2E–2F illustrate iteration in the second preferred embodiment.
Figure 2F:
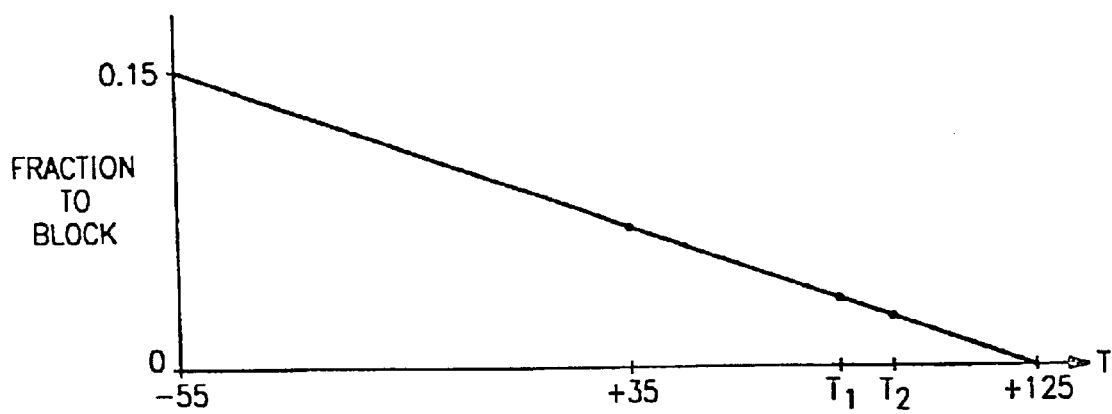
Figure 29:
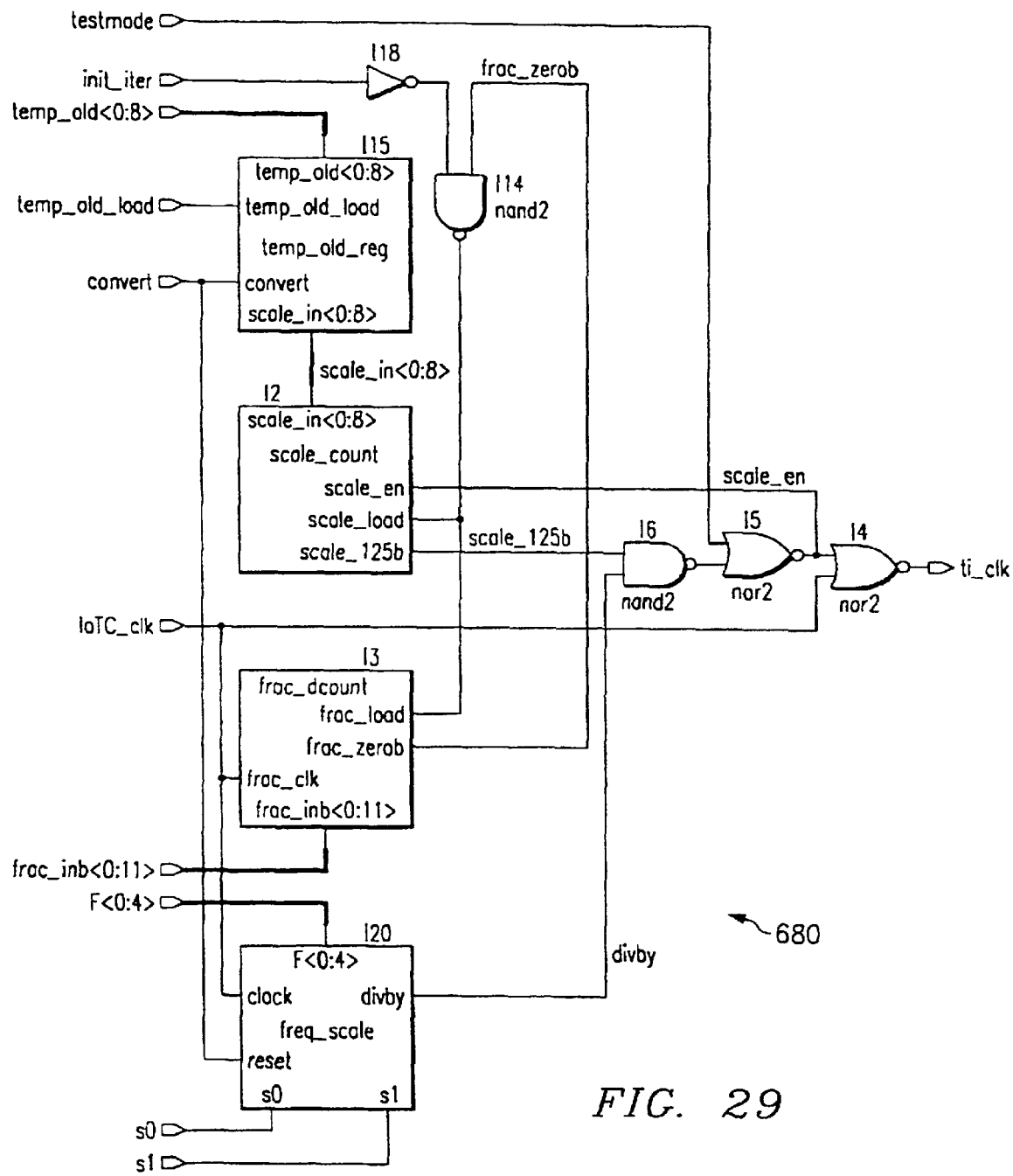
FIG. 29 is a schematic showing the prescaler circuitry 680 in FIG. 2D.

FIG. 29 is a schematic showing the circuitry for prescaler 680 of FIG. 2D. Note that prescaler 680 actually mitigates the granularity due to the size of Fraction by introducing a new parameter F and spreading out the blocking of oscillations by subgrouping a group of size Fraction into subgroups of size F and blocking only a fixed number from each subgroup according to the following table:

| Last Temperature | Number blocked per size F subgroup |
| --- | --- |
| −55 ≤ T < −10 | 4 |
| −10 ≤ T < 35 | 3 |
| 35 ≤ T < 80 | 2 |
| 80 ≤ T ≤ 125 | 1 |

Signal line S in FIG. 2D provides the number to be blocked out of each size F subgroup of oscillations to fractional down counter 685. F is a trimmed value of up to 31 and is chosen to be the maximum integer less than 4Fraction/360 for the case of half-degree resolutions (360 is the number of half degrees in the range −55° C. to +125° C.). For example, if the temperature is +10° C. and Fraction=2500 (half-degree resolution with α roughly 800 ppm/° C.), F would be 27. The total number of oscillations blocked per group of size Fraction (2500) would be 230, and 3 out of every 27 would be blocked until the total reached 230. That is, the first 2052 (=27×76) oscillations in a group of 2500 (Fraction) would have 3×76=228 blocked, the next 27 would have 2 blocked to reach the 230 total, and the remaining 421 would not have any blocked.

This mitigates the granularity due to Fraction, as can be seen by continuing the example. First, presume that low temperature coefficient oscillator 610 puts out a total of 11,000 oscillations during one measurement cycle (a $2^{13}$ count down by 13-bit down counter 640). Because 230 oscillations are blocked out of each 2500, the first 10,000 (=4×2500) oscillations will have 920(=4×230) blocked. Then, ideally during the last 1000 oscillations, 1000×230/2500=92 should be blocked. But prescaler 680 blocks 3 out of every 27, so 111(=3×37) will be blocked because 37 subgroups of size 27 fit into the last 1,000 with remainder 1. Thus the error would be a count of 111−92=19, and this is roughly a 0.2 degree error when TC1 is about a typical 100. Without this spreading, the error would be much greater. In particular, if the 230 oscillations to be blocked out of each 2500 are the first 230, then in this example, 230 out of the last 1000 would have been blocked and the error would have been 230−92=138, which translates to roughly 1.4 degrees for TC1 about 100.

The calibration of the calibration circuitry in temperature detectors 300 and 600 to set the parameters (b and m for temperature detector 300 and Base Count, TC1, TC2, Fraction, and F for temperature detector 600) proceeds simply by holding a detector in a temperature controlled chamber (with temperature being measured) while the temperature insensitive oscillator 310 and temperature sensitive oscillator 320 or low temperature coefficient oscillator 610 and high temperature coefficient oscillator 620 run and the number of oscillations or the frequency is measured in a test mode at three different temperatures (such as the 10°, 50°, and 90° C. previously noted). The parameters are then computed and entered into the detector and may reside in EPROM or other nonvolatile memory. This calibration occurs after packaging of the integrated circuit.

Further Modifications and Variations

The preferred embodiments may be modified in many ways while retaining one of more of the features of a temperature-to-time conversion followed by a digitizing of the time to yield a digital temperature measurement and an iterative approach for using a temperature dependent adjustment (such as oscillation blocking) for computing a temperature.

For example, the temperature-to-time converter 220 of FIGS. 3A, 3B, 3C could be replaced by a simple delay line made of field effect transistors, carrier mobility and saturation currents decrease with temperature and thus delays increase and again lead to longer count times for temperature insensitive oscillator 310. Thus an enable signal would start counter 330 and enter the delay line; after a temperature dependent delay, the signal would emerge from the delay line and disable counter 330. Similarly, the time interval could be converted to a voltage for analog control by having a current with small temperature dependence charge up a capacitor with small temperature dependence for the time interval.

Further examples include modifying the prescaler circuitry 680 of FIGS. 6 and 8 for nonlinearity by using a lookup table (EPROM) to determine the number of oscillations to block for a given approximation temperature, that is, temperature iteration register 681 would drive the address of the lookup table and the output would be the count for counter 683.

The overall quadratic approximation mode of temperature detector 600 which does not use prescaler 680 could be enhanced to a cubic approximation by calibration at four temperatures and using an additional parameter TC3 (a third derivative) plus another feedback plus adder to increment TC2 by TC3 on each reloading of 15-bit down counter 630. Even higher order approximations could be used, although the errors in calibration due to items such as inaccurate temperature chamber temperatures, internal rounding errors, and so forth limit the usefulness of high order approximations.

In addition, practically all of the functions involving the analysis (e.g., quadratic estimation, prescaler, conversion, etc.) can be performed with software and executed by circuitry embedded in a single integrated circuit (containing some or all of the other block modules) or by circuitry embedded in a host system (e.g., a personal computer, local microprocessor, etc.).

Moreover, alternate methods and systems can be used to provide an input that corresponds to temperature (which is inputted into the calibration circuitry described in detail above). In other words, as described above, while preferred embodiments use a delay circuitry to create a delay having a length directly proportional to temperature, other systems and methods can be used to create inputs that vary with temperature, such as a thermistor to create an input having a voltage varying with the temperature.

We claim:

1. An apparatus for monitoring temperature, the apparatus comprising:

a signal generator for generating an output signal responsive to a temperature, the output signal including a delay component;

a circuitry connected to the signal generator, the circuitry for receiving the output signal from the signal generator and for generating a digital temperature representation responsive to the received output signal;

a power supply regulator connected to the signal generator and the circuitry, the power supply regulator for supplying a regulated power to the signal generator and to the circuitry.

2. The apparatus of claim 1, wherein the length of the delay component corresponds to the temperature.

3. The apparatus of claim 1, further comprising:

a storage device for storing a look-up table, the look-up table including information corresponding to the output signal generated by the signal generator;

wherein the circuitry reads the information from the look-up table responsive to the output signal received from the signal generator and wherein the circuitry generates the digital temperature representation responsive to the information read from the look-up table.

4. The apparatus of claim 1, wherein the signal generator comprises:

a first sensitivity element, the first sensitivity element for detecting temperatures over a first range; and a second sensitivity element, the second sensitivity for detecting temperatures over a second range.

5. The apparatus of claim 4, wherein the first sensitivity element includes a first oscillator for oscillating at a first rate and wherein the second sensitivity element includes a second oscillator for oscillating a second rate.

6. An apparatus for monitoring temperature, the apparatus comprising:

a signal generator for generating an output signal responsive to a temperature, the output signal including a delay component;

a circuitry connected to the signal generator, the circuitry for receiving the output signal from the signal generator and for generating a digital temperature representation responsive to the received output signal; and a storage device for storing a look-up table, the look-up table including information corresponding to the output signal generated by the signal generator;

wherein the circuitry reads the information fro the look-up table responsive to the output signal received from the signal generator and wherein the circuitry generates the digital temperature representation responsive to the information read from the look-up table.

7. The apparatus of claim 6, further comprising:

a power supply regulator connected to the signal generator and the circuitry, the power supply regulator for supplying a regulated power to the signal generator and to the circuitry.

8. The apparatus of claim 6, wherein the signal generator comprises:

a first sensitivity element, the first sensitivity element for detecting temperatures over a first range; and a second sensitivity element, the second sensitivity for detecting temperatures over a second range.

9. The apparatus of claim 8, wherein the first sensitivity element includes a first oscillator for oscillating at a first rate and wherein the second sensitivity element includes a second oscillator for oscillating a second rate.

10. An apparatus for monitoring temperature, the apparatus comprising:

a signal generator for generating an output signal responsive to a temperature, the output signal including a delay component; and a circuitry connected to the signal generator, the circuitry for receiving the output signal from the signal generator and for generating a digital temperature representation responsive to the received output signal;

wherein the signal generator comprises:

a first sensitivity element, the first sensitivity element for detecting temperatures over a first range; and a second sensitivity element, the second sensitivity for detecting temperatures over a second range.

11. The apparatus of claim 10, wherein the first sensitivity element includes a first oscillator for oscillating at a first rate and wherein the second sensitivity element includes a second oscillator for oscillating a second rate.

12. The apparatus of claim 10, further comprising:

a storage device for storing a look-up table, the look-up table including information corresponding to the output signal generated by the signal generator;

wherein the circuitry reads the information from the look-up table responsive to the output signal received from the signal generator and wherein the circuitry generates the digital temperature representation responsive to the information read from the look-up table.

* * * * *

UNITED STATES PATENT AND TRADEMARK OFFICE
CERTIFICATE OF CORRECTION

PATENT NO. : 6,115,441
DATED : September 5, 2000
INVENTOR(S) : James Michael Douglass et al.

Page 1 of 1

It is certified that error appears in the above-identified patent and that said Letters Patent is hereby corrected as shown below:

Column 1,
Delete lines 4-21

Column 8,
Line 41, delete "a" replace with -- α --

Signed and Sealed this

Twenty-fifth Day of September, 2001

Attest:

*Attesting Officer*

NICHOLAS P. GODICI
*Acting Director of the United States Patent and Trademark Office*